United States Patent
Gondoh et al.

(10) Patent No.: US 10,988,594 B2
(45) Date of Patent: Apr. 27, 2021

(54) POLYCARBONATE-BASED RESIN FOAM PARTICLE AND FOAM MOLDED BODY

(71) Applicant: SEKISUI PLASTICS CO., LTD., Osaka (JP)

(72) Inventors: Yuichi Gondoh, Nara (JP); Naoki Michihata, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 241 days.

(21) Appl. No.: 16/331,831

(22) PCT Filed: Sep. 9, 2016

(86) PCT No.: PCT/JP2016/076708
§ 371 (c)(1),
(2) Date: Mar. 8, 2019

(87) PCT Pub. No.: WO2018/047316
PCT Pub. Date: Mar. 15, 2018

(65) Prior Publication Data
US 2019/0248978 A1    Aug. 15, 2019

(51) Int. Cl.
*C08J 9/18*    (2006.01)
*C08J 9/232*    (2006.01)
(Continued)

(52) U.S. Cl.
CPC .............. *C08J 9/232* (2013.01); *C08G 64/06* (2013.01); *C08J 9/0023* (2013.01); *C08J 9/18* (2013.01);
(Continued)

(58) Field of Classification Search
CPC ... C08J 9/232; C08J 9/0023; C08J 9/18; C08J 2203/06; C08J 2203/22; C08J 2205/04;
(Continued)

(56) References Cited

U.S. PATENT DOCUMENTS 3,903,224 A    9/1975 Billiu
4,544,677 A    10/1985 Allen et al.
(Continued)

FOREIGN PATENT DOCUMENTS

JP    06-100724    4/1994
JP    09-076332    3/1997
(Continued)

OTHER PUBLICATIONS

Supplemental European Search Report for EP 16915734.4 dated Feb. 21, 2020.
(Continued)

*Primary Examiner* — Kara B Boyle
(74) *Attorney, Agent, or Firm* — Greenblum & Bernstein, P.L.C.

(57) ABSTRACT

Expanded particles of a polycarbonate-based resin containing a polycarbonate-based resin containing a component derived from bisphenol A as abase resin, the expanded particles being expanded particles of a polycarbonate-based resin satisfying any one of the following conditions (a) to (c) in a GC/MS chart: (a) a peak derived from a molecular weight of from 145 to 230 and a peak derived from a molecular weight of from 320 to 350 are shown; (b) a peak derived from a molecular weight of from 210 to 230 is shown; and (c) a peak derived from a molecular weight of from 290 to 320 is shown.

25 Claims, 9 Drawing Sheets

(a)

(b)

(51) Int. Cl.
*C08G 64/06* (2006.01)
*C08J 9/00* (2006.01)
*C08K 5/103* (2006.01)
*C08K 5/11* (2006.01)

(52) U.S. Cl.
CPC ............. *C08K 5/103* (2013.01); *C08K 5/11* (2013.01); *C08G 2110/0058* (2021.01); *C08J 2203/06* (2013.01); *C08J 2203/22* (2013.01); *C08J 2205/04* (2013.01); *C08J 2205/042* (2013.01); *C08J 2205/044* (2013.01); *C08J 2369/00* (2013.01)

(58) Field of Classification Search
CPC ............ C08J 2205/042; C08J 2205/044; C08J 2369/00; C08J 2201/032; C08J 9/122; C08G 64/06; C08G 2110/0058; C08G 69/00; C08K 5/103; C08K 5/11; C08K 5/10
See application file for complete search history.

(56) References Cited

U.S. PATENT DOCUMENTS

| | | | |
|---|---|---|---|
| 6,191,178 | B1 | 2/2001 | Shioya et al. |
| 8,529,808 | B2 * | 9/2013 | Sandler ................. B32B 5/18 264/51 |
| 2012/0141794 | A1 * | 6/2012 | Harada ................. B29C 44/445 428/402 |
| 2013/0251979 | A1 | 9/2013 | Saitou et al. |
| 2014/0357748 | A1 | 12/2014 | Yamaoka et al. |

FOREIGN PATENT DOCUMENTS

| | | |
|---|---|---|
| JP | 11-236736 | 8/1999 |
| JP | 11-287277 | 10/1999 |
| JP | 2008-127467 | 6/2008 |
| JP | 2012-140599 | 7/2012 |
| JP | 2016-125041 | 7/2016 |
| JP | 2016-160400 | 9/2016 |
| JP | 2016160400 A * | 9/2016 |
| WO | 2011/019057 | 2/2011 |

OTHER PUBLICATIONS

Office Action for European Patent Application No. 16 915 734.4 dated Sep. 3, 2020.
Office Action for Korean Patent Application No. 10-2019-7003610 dated Apr. 23, 2020 with English translation.
International Search Report issued in International Pat. Appl. No. PCT/JP2016/076708, dated Dec. 13, 2016, in Japanese and English.
Written Opinion issued in International Pat. Appl. No. PCT/JP2016/076708, dated Dec. 13, 2016, in Japanese and English.

* cited by examiner

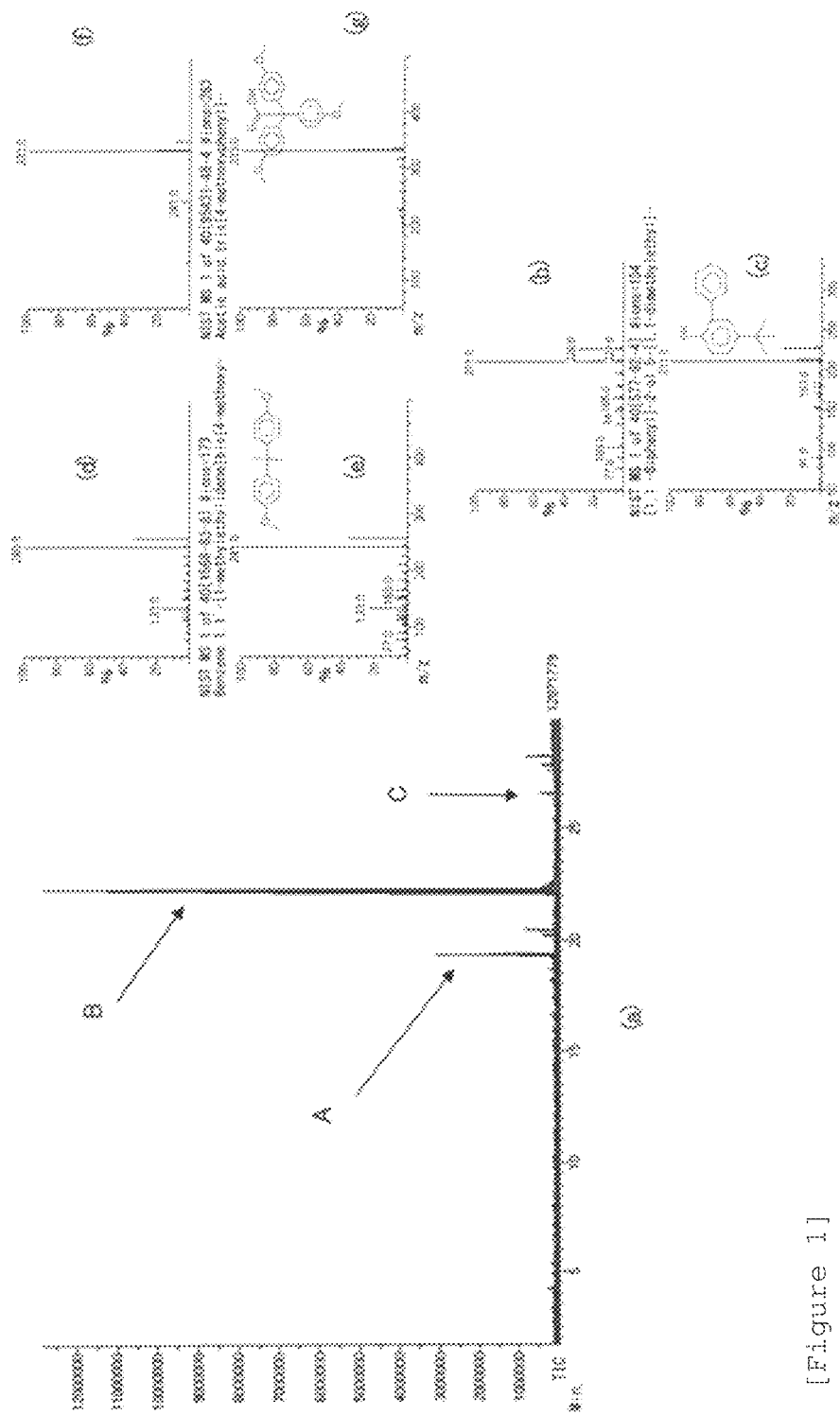
[Figure 1]

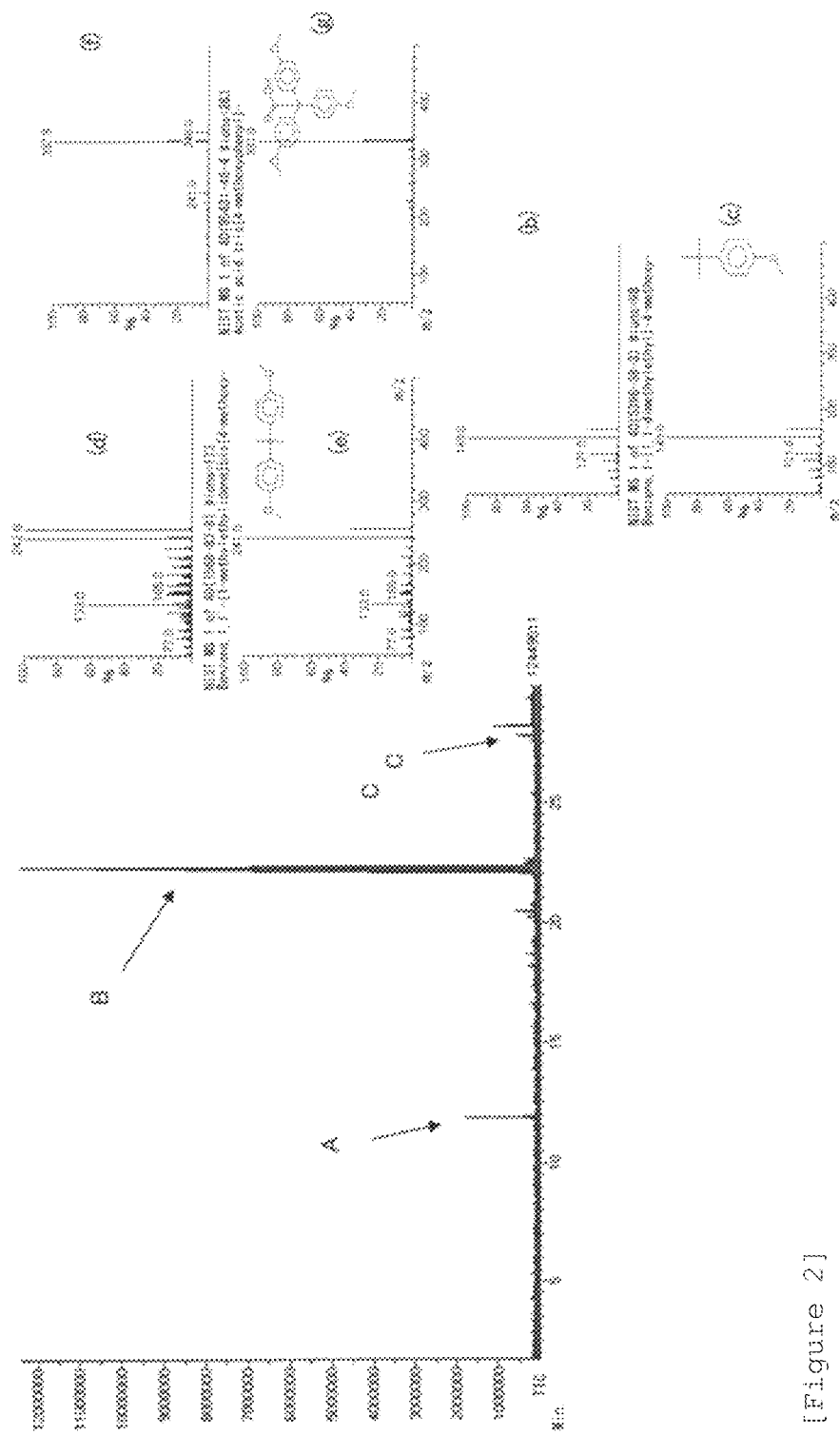
[Figure 2]

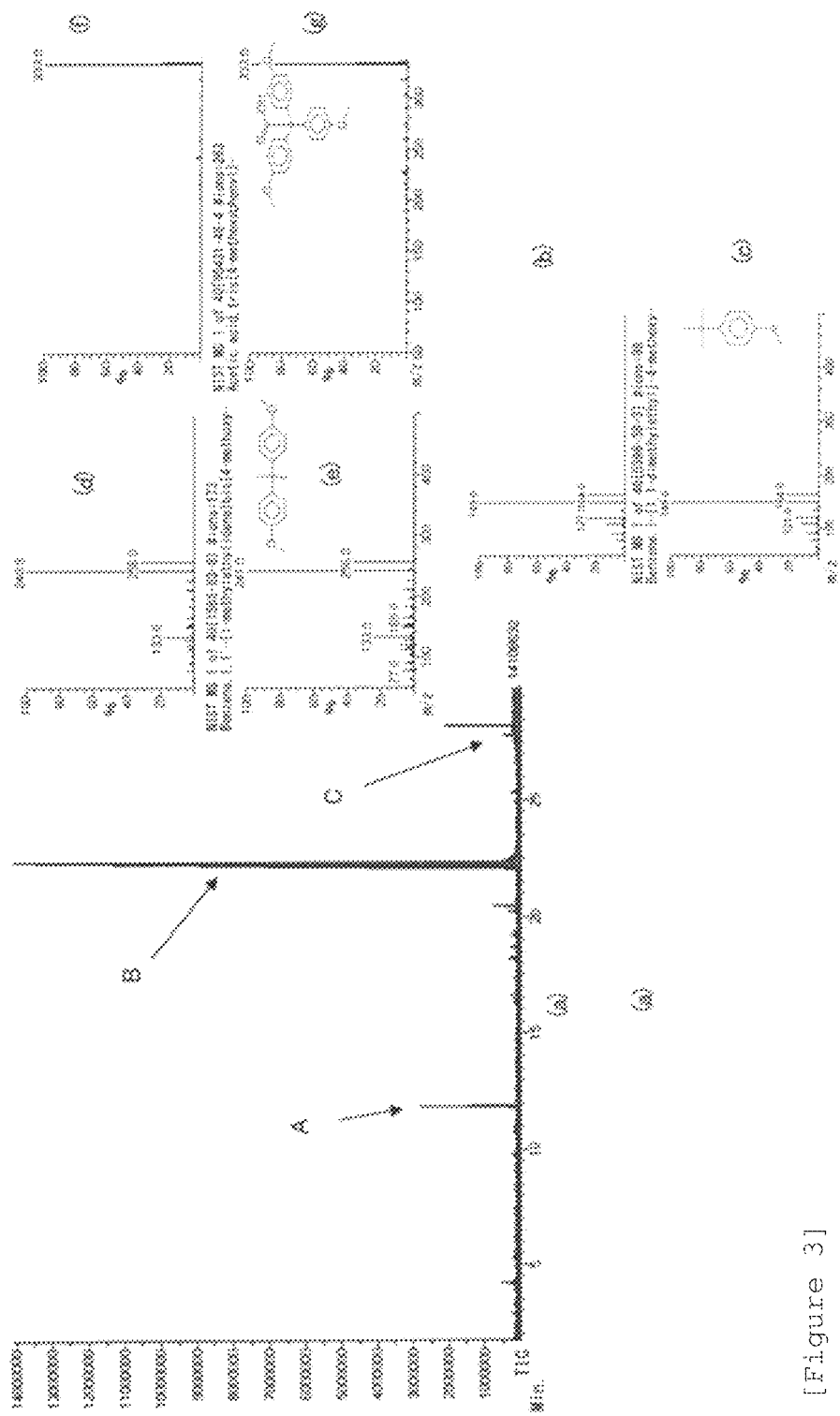
[Figure 3]

[Figure 4]
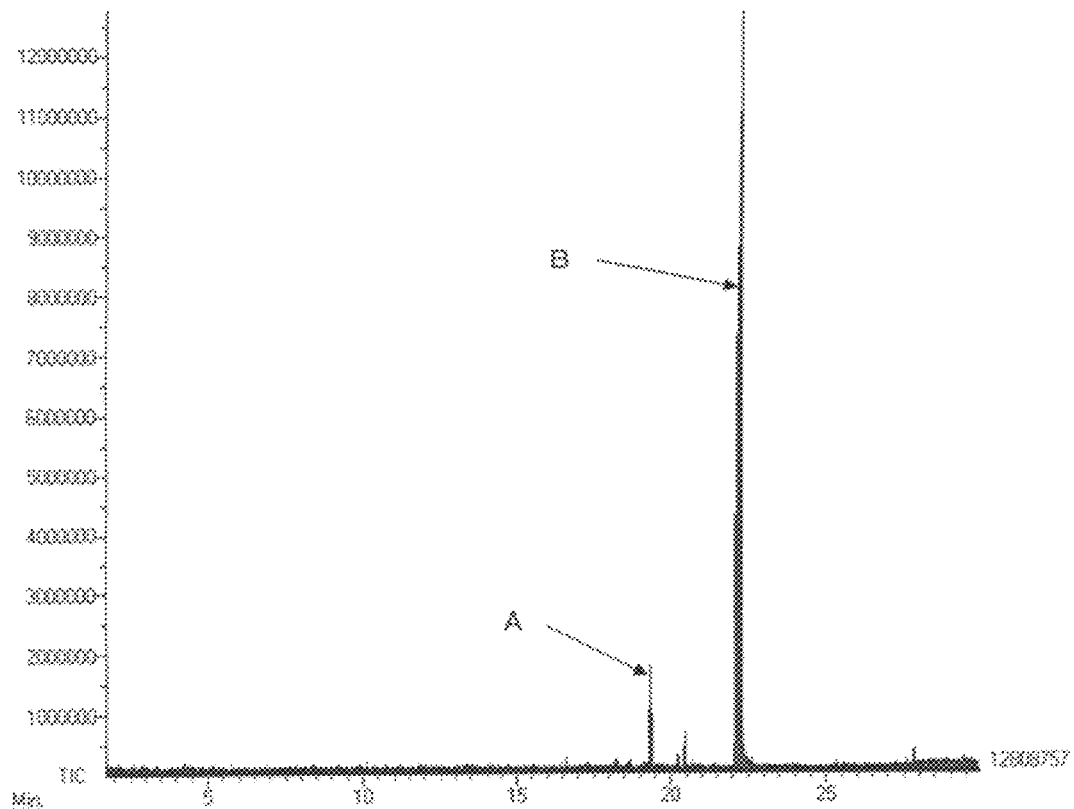
(a)
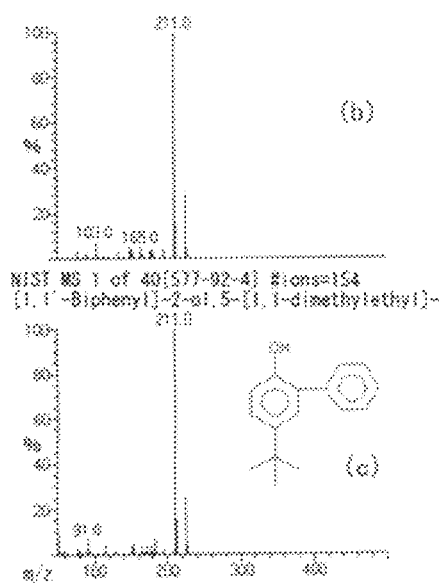
(b)
(c)
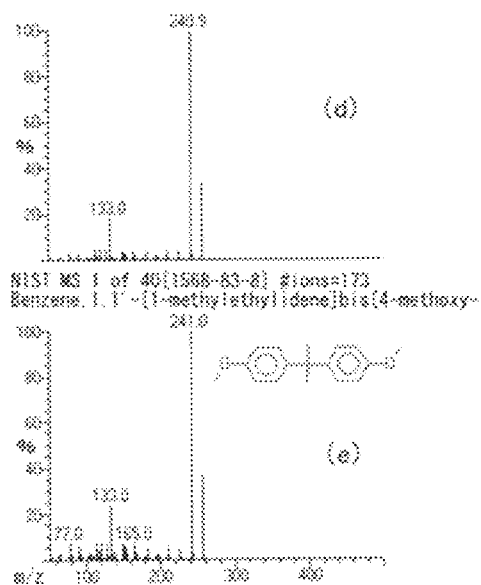
(d)
(e)

[Figure 5]
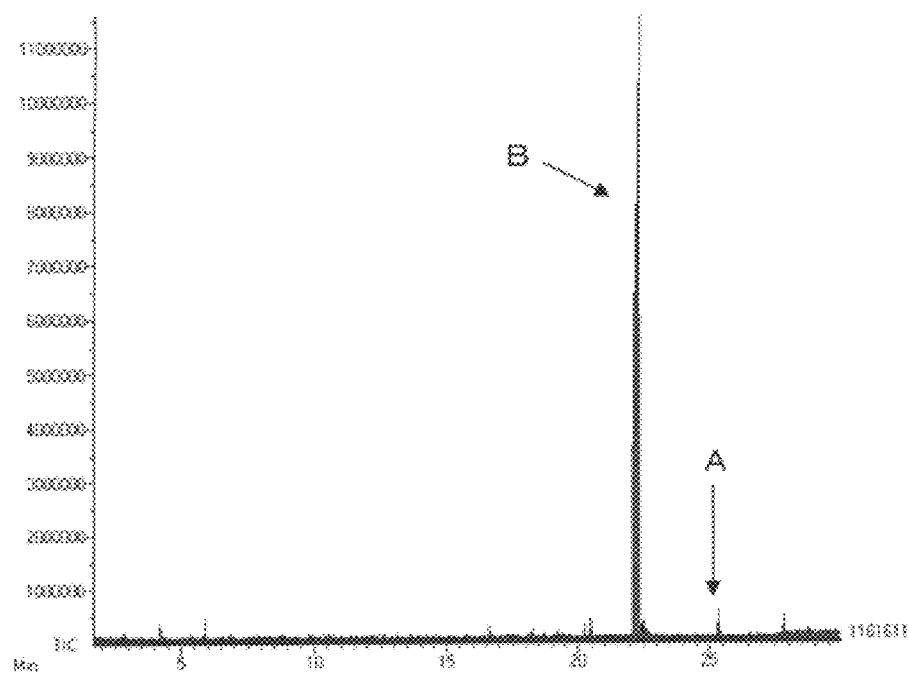
(a)
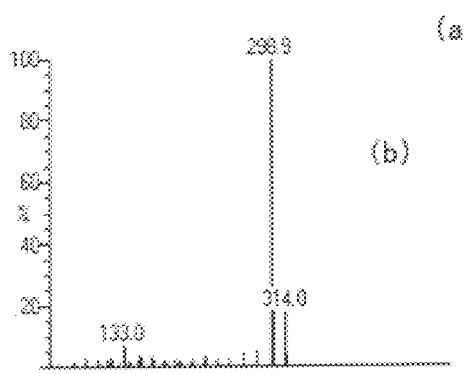
(b)
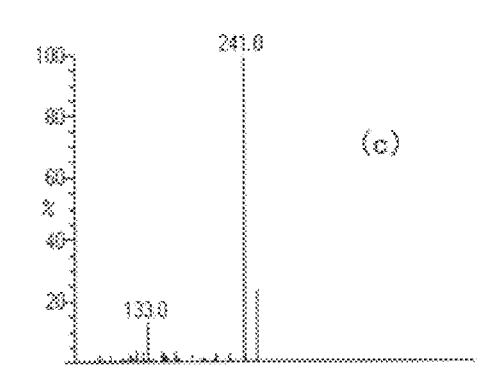
(c)
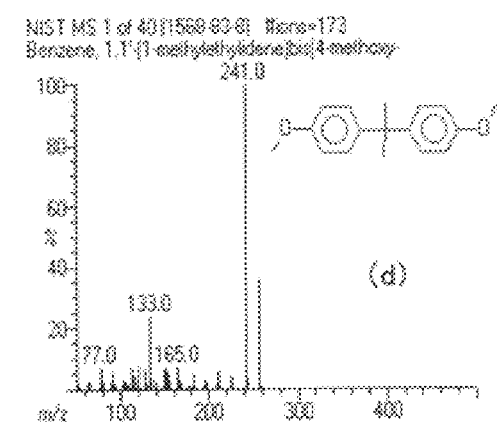
(d)

[Figure 6]
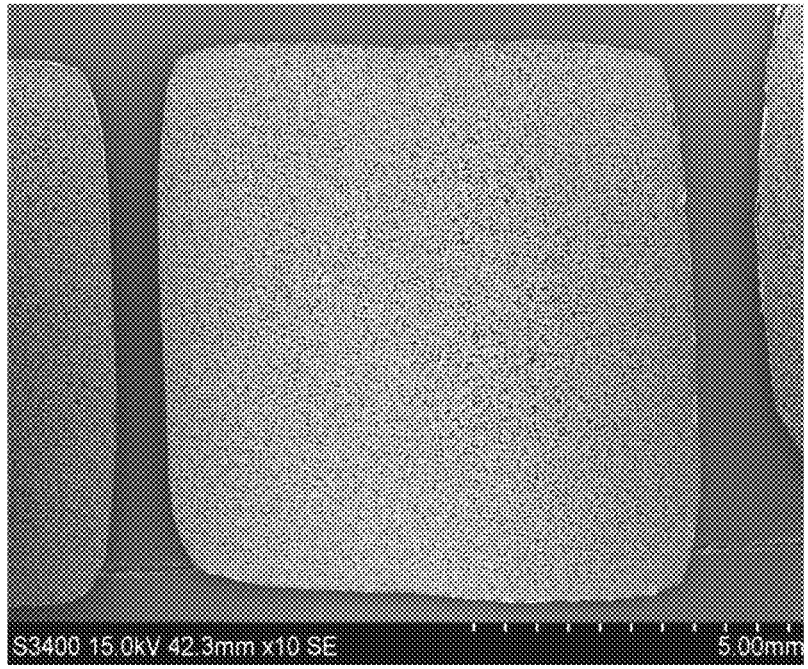
(a)
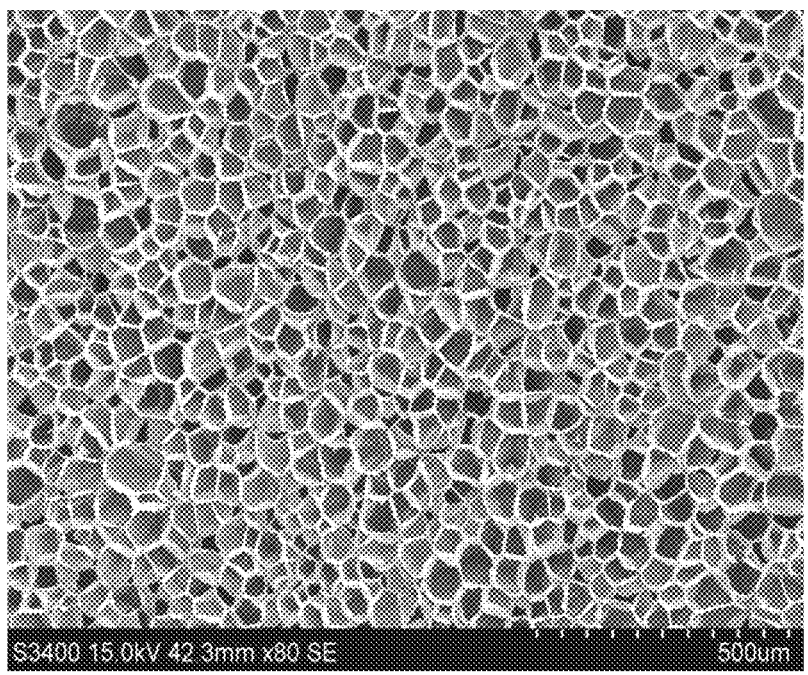
(b)

[Figure 7]
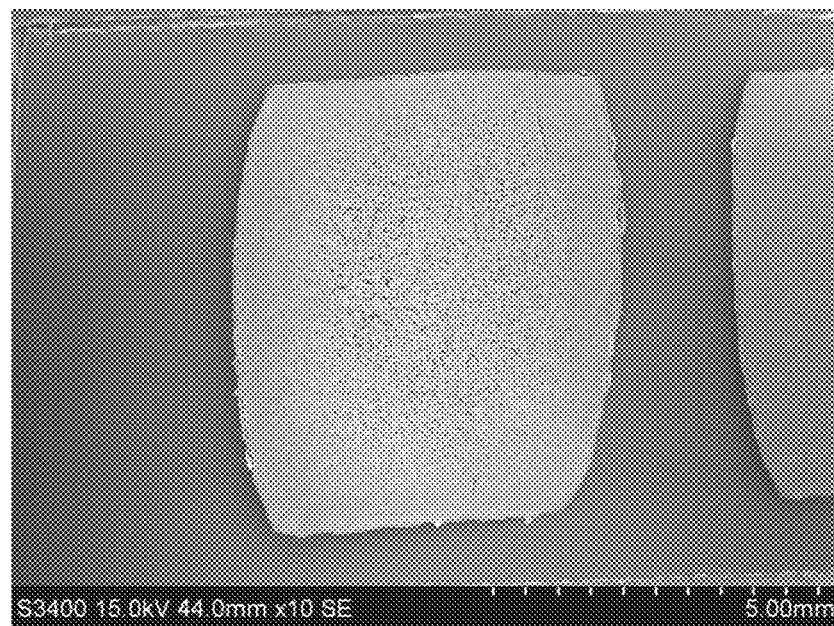
(a)
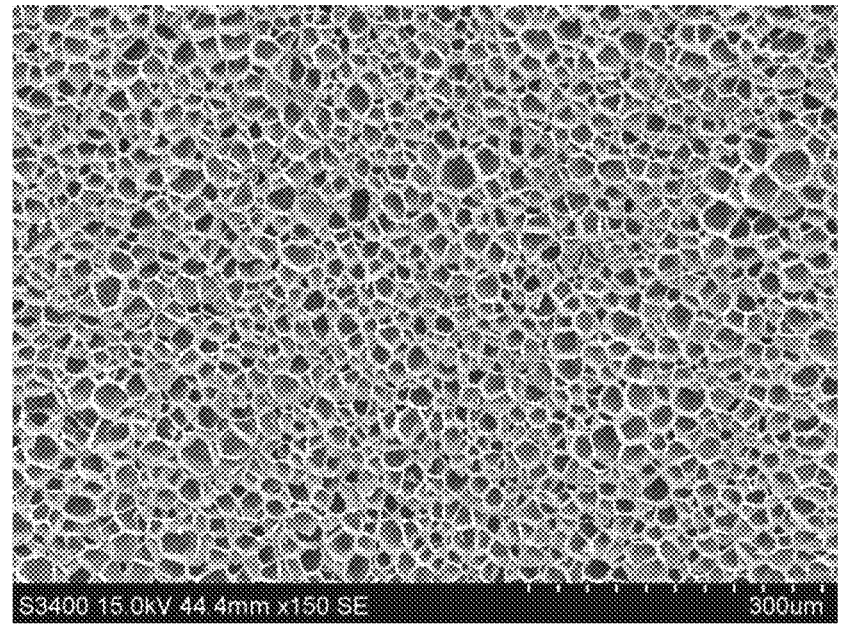
(b)

[Figure 8]
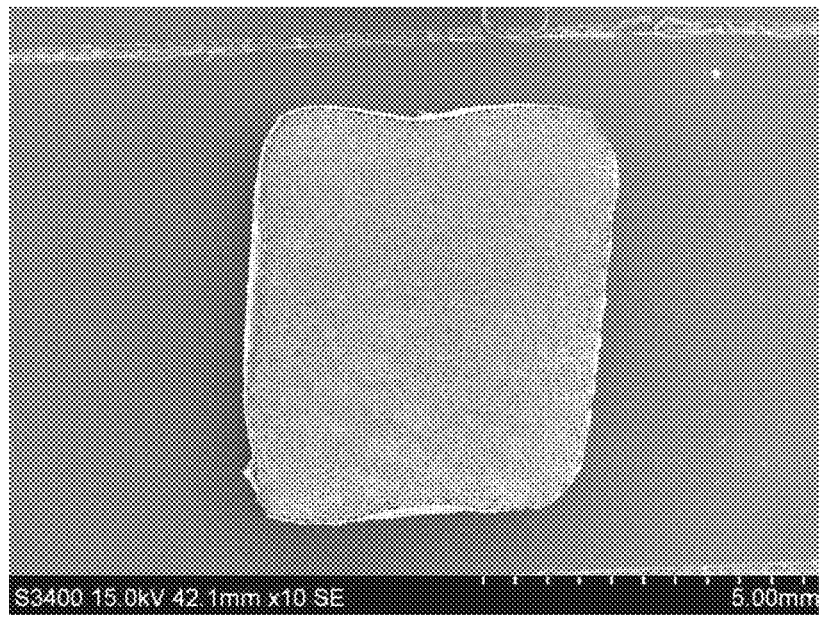
(a)
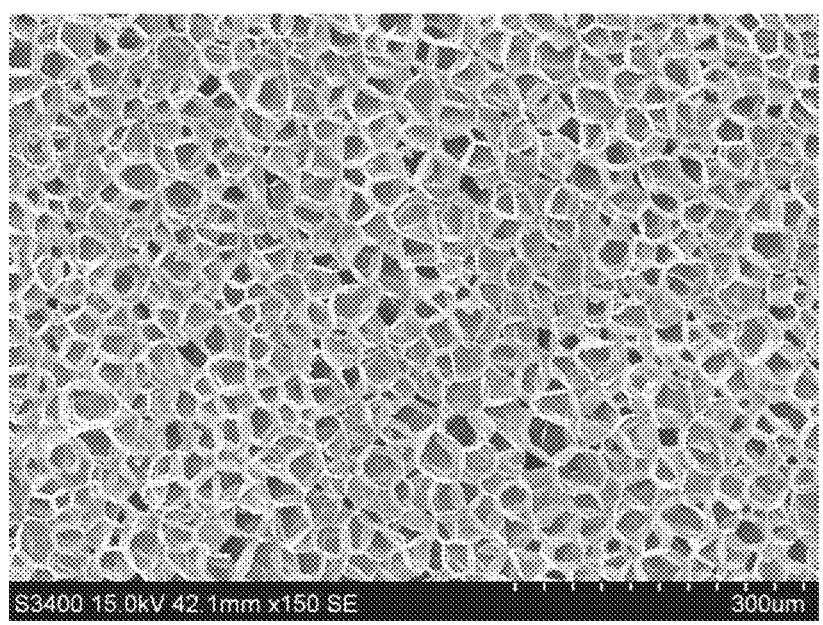
(b)

[Figure 9]
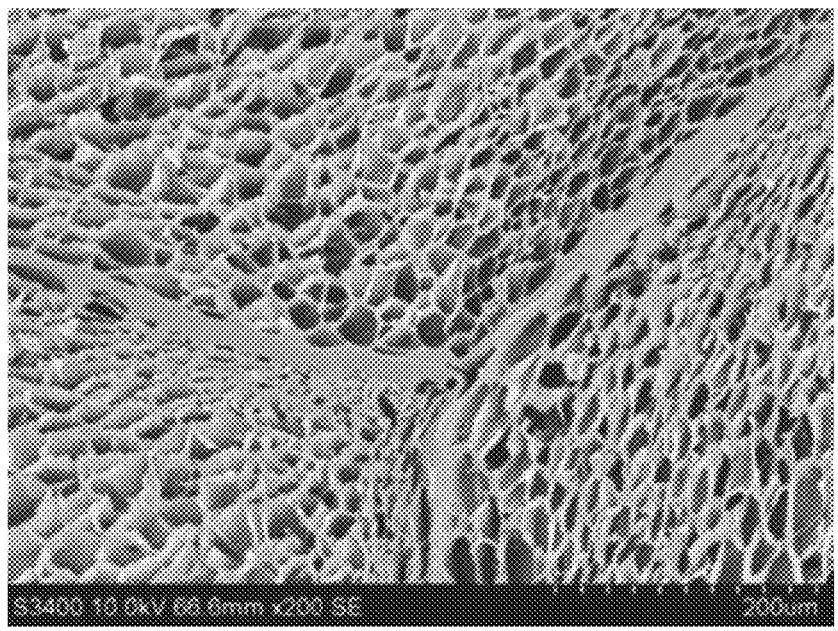

POLYCARBONATE-BASED RESIN FOAM PARTICLE AND FOAM MOLDED BODY

TECHNICAL FIELD

The present invention relates to expanded particles and an expanded molded article of a polycarbonate-based resin. More specifically, the invention relates to an expanded molded article of a polycarbonate-based resin excellent in expandability, moldability, and appearance, and expanded particles of a polycarbonate-based resin capable of providing the expanded molded article.

BACKGROUND ART

An expanded molded article has been used in various fields including food packaging trays and vehicle components, and also including building materials, civil engineering materials, and lighting equipments, due to the good processability and shape retention capability and the relatively large strength, in addition to the lightweight property thereof. There is a tendency that an expanded molded article made of a polystyrene-based resin has been used in the case where thermal resistance is not particularly demanded, and an expanded molded article made of an olefin-based resin, such as polypropylene and polyethylene, has been used in the case where cushioning characteristics, recovery property, resilience, and the like are demanded.

Examples of resins that generally have higher thermal resistance than the polystyrene-based resin and the olefin-based resin include a polycarbonate-based resin. The polycarbonate-based resin is a resin material that is capable of being used in foreign countries outside Japan and in areas under extreme weather condition, such as arid regions and tropical regions. The polycarbonate-based resin is not only excellent in thermal resistance, but also excellent in water resistance, electric characteristics, mechanical strength, aging resistance, and chemical resistance. The polycarbonate-based resin has been used as interior materials of buildings due to these characteristics, and in recent years, is being expected to spread to such purposes as vehicle components, packaging materials, various containers, and the like by taking advantage of the excellent characteristics thereof.

The well known manufacturing methods of an expanded article of a polycarbonate-based resin include the extrusion expansion method described in PTL 1 (JP-A-9-076332) and PTL 2 (JP-A-11-236736). However, an expanded article obtained by the method is in a form of boards, from which only a simple building material can be obtained. Therefore, it has been difficult to provide an expanded article having a complicated shape, such as a vehicle component, by the extrusion expansion method.

The known methods for enabling complicated shapes include an in-mold expansion molding method, in which expanded particles are expanded and fusion bonded in a molding cavity. In this method, a mold having a cavity corresponding to the desired shape is prepared, the cavity is filled with expanded particles, and the expanded particles are expanded and fusion bonded by heating, thereby enabling the manufacture of an expanded molded article having a complicated shape. The methods for providing an expanded molded article by the in-mold expansion molding method from expanded particles made of a polycarbonate-based resin are proposed in PTL 3 (JP-A-6-100724), PTL 4 (JP-A-11-287277), and PTL 5 (WO 2011/019057).

CITATION LIST

Patent Literatures

PTL 1: JP-A-9-076332
PTL 2: JP-A-11-236736
PTL 3: JP-A-6-100724
PTL 4: JP-A-11-287277
PTL 5: WO 2011/019057

SUMMARY OF INVENTION

Technical Problem

However, there are problems in PTLs 3 to 5 including the difficulty in highly expanding and the unfavorable moldability, and also including the deteriorated appearance of the expanded molded article.

In PTLs 3 to 5, furthermore, the expanded particles are fusion bonded by heating with steam for providing an expanded molded article, and therefore it is difficult to provide an expanded molded article having the expanded particles that are sufficiently fusion bonded to each other. Although there may be a method using an adhesive for bonding the expanded particles, it can be readily presumed that the use thereof becomes a factor deteriorating the lightweight properties and the thermal characteristics inherent to the polycarbonate-based resin.

Solution to Problem

As a result of the investigations by the inventors of the invention on the polycarbonate-based resin used in view of the problems, it has been surprisingly found that an expanded molded article that is excellent in expandability, moldability, and appearance, and expanded particles of a polycarbonate-based resin that are capable of providing the expanded molded article can be provided, by using a polycarbonate-based resin having, at particular positions in a GC/MS chart obtained through measurement by a reactive pyrolysis GC/MS method, (a) a peak derived from a molecular weight of from 145 to 230 and a peak derived from a molecular weight of from 320 to 350, (b) a peak derived from a molecular weight of from 210 to 230, or (c) a peak derived from a molecular weight of from 290 to 320, and thus the invention has been completed.

The invention provides expanded particles of a polycarbonate-based resin including, as a base resin, a polycarbonate-based resin containing a component derived from bisphenol A, the expanded particles satisfying any one of the following conditions (a) to (c) in a GC/MS chart with a retention time as an abscissa obtained through measurement by a reactive pyrolysis GC/MS method utilizing reaction of methyl etherifying an ester bond contained in the polycarbonate-based resin through hydrolysis with tetramethylammonium hydroxide as a reaction reagent under condition of helium used as a carrier gas with a carrier gas flow rate of 34 mL/min:

(a) a peak derived from a molecular weight of from 145 to 230 and a peak derived from a molecular weight of from 320 to 350 are shown, the peak derived from a molecular weight of from 145 to 230 is observed at a retention time in a range of −15 minutes or less based on a retention time of a maximum peak showing the component derived from bisphenol A, and the peak derived from a molecular weight of from 320 to 350 is observed at a retention time in a range of +10 minutes or less based on a retention time of a maximum peak showing the component derived from bisphenol A;

(b) a peak derived from a molecular weight of from 210 to 230 is shown, and the peak derived from a molecular weight of from 210 to 230 is observed at a retention time in a range of 5 minutes or less based on a retention time of a maximum peak showing the component derived from bisphenol A; and (c) a peak derived from a molecular weight of from 290 to 320 is shown, and the peak derived from a molecular weight of from 290 to 320 is observed at a retention time in a range of 5 minutes or less based on a retention time of a maximum peak showing the component derived from bisphenol A.

The invention also provides an expanded molded article of a polycarbonate-based resin containing plural expanded particles, the expanded particles including, as a base resin, a polycarbonate-based resin containing a component derived from bisphenol A, the expanded molded article satisfying any one of the following conditions (a) to (c) in a GC/MS chart with a retention time as an abscissa obtained through measurement by a reactive pyrolysis GC/MS method utilizing reaction of methyl etherifying an ester bond contained in the polycarbonate-based resin through hydrolysis with tetramethylammonium hydroxide as a reaction reagent under condition of helium used as a carrier gas with a carrier gas flow rate of 34 mL/min:

(a) a peak derived from a molecular weight of from 145 to 230 and a peak derived from a molecular weight of from 320 to 350 are shown, the peak derived from a molecular weight of from 145 to 230 is observed at a retention time in a range of −15 minutes or less based on a retention time of a maximum peak showing the component derived from bisphenol A, and the peak derived from a molecular weight of from 320 to 350 is observed at a retention time in a range of +10 minutes or less based on a retention time of a maximum peak showing the component derived from bisphenol A;

(b) a peak derived from a molecular weight of from 210 to 230 is shown, and the peak derived from a molecular weight of from 210 to 230 is observed at a retention time in a range of 5 minutes or less based on a retention time of a maximum peak showing the component derived from bisphenol A; and (c) a peak derived from a molecular weight of from 290 to 320 is shown, and the peak derived from a molecular weight of from 290 to 320 is observed at a retention time in a range of 5 minutes or less based on a retention time of a maximum peak showing the component derived from bisphenol A.

Advantageous Effects of Invention

According to the invention, an expanded molded article of a polycarbonate-based resin that is excellent in expandability, moldability, and appearance, and expanded particles of a polycarbonate-based resin that are capable of providing the expanded molded article can be provided.

According to any of the following cases, an expanded molded article of a polycarbonate-based resin that is further excellent in expandability, moldability, and appearance, and expanded particles of a polycarbonate-based resin that are capable of providing the expanded molded article can be provided.

(1) The peak derived from a molecular weight of from 145 to 230 is derived from a terminal portion constituting the polycarbonate-based resin, and the peak derived from a molecular weight of from 320 to 350 is derived from a branched structure portion constituting the polycarbonate-based resin.

(2) The maximum peak showing the component derived from bisphenol A and the peak derived from a molecular weight of from 145 to 230 have an area ratio of from 1/0.02 to 1/0.07, and the maximum peak showing the component derived from bisphenol A and the peak derived from a molecular weight of from 320 to 350 have an area ratio of from 1/0.005 to 1/0.05.

(3) The peak derived from a molecular weight of from 210 to 230 is derived from a terminal portion constituting the polycarbonate-based resin.

(4) The maximum peak showing the component derived from bisphenol A and the peak derived from a molecular weight of from 210 to 230 have an area ratio of from 1/0.01 to 1/0.07.

(5) The maximum peak showing the component derived from bisphenol A and the peak derived from a molecular weight of from 290 to 320 have an area ratio of from 1/0.005 to 1/0.04.

(6) The expanded particles have a bulk density of 0.08 g/cm$^3$ or less.

(7) The expanded particles have a cell density X of from $1.0 \times 10^8$ to $1.0 \times 10^{12}$ per cm$^3$ (wherein the cell density X is calculated by the following expression:

$$\text{cell density } X = (\rho/D - 1)/\{(4/3) \cdot \pi \cdot (C/10/2)^3\}$$

wherein C represents an average cell diameter (mm); $\rho$ represents a density (kg/m$^3$) of the polycarbonate-based resin; and D represents an apparent density (kg/m$^3$) of the expanded particles).

(8) The average cell diameter is from 0.0030 to 0.2000 mm, the density of the polycarbonate-based resin is from $1.0 \times 10^3$ to $1.4 \times 10^3$ kg/m$^3$, and the apparent density of the expanded particles is from 12 to 600 kg/m$^3$.

(9) The expanded molded article has a density of 0.08 g/cm$^3$ or less.

In the following cases, furthermore, the appearance of the expanded molded article obtained from the expanded particles can be improved, and the fusion bondability among the expanded particles can be enhanced, by defining the cell density X of the expanded particles or the expanded molded articles to the particular range, even though the polycarbonate-based resin does not have the peaks showing the particular molecular weights at the particular positions as described above. In addition, the expanded particles can be controlled in thickness of the cell membrane due to the particular cell density X thereof, thereby providing an effect of improving the secondary expandability in molding.

Expanded particles of a polycarbonate-based resin containing a polycarbonate-based resin as a base resin, the expanded particles having a cell density X of from $1.0 \times 10^8$ to $1.0 \times 10^{12}$ per cm$^3$ (wherein the cell density X is calculated by the following expression:

$$\text{cell density } X = (\rho/D - 1)/\{(4/3) \cdot \pi \cdot (C/10/2)^3\}$$

wherein C represents an average cell diameter (mm); ρ represents a density (kg/m³) of the polycarbonate-based resin; and D represents an apparent density (kg/m³) of the expanded particles).

An expanded molded article of a polycarbonate-based resin containing a polycarbonate-based resin as a base resin, the expanded molded article having a cell density X of from $1.0\times10^8$ to $1.0\times10^{12}$ per cm³ (wherein the cell density X is calculated by the following expression:

cell density $X=(\rho/D-1)/\{(4/3)\cdot\pi\cdot(C/10/2)^3\}$ wherein C represents an average cell diameter (mm); ρ represents a density (kg/m³) of the polycarbonate-based resin; and D represents an apparent density (kg/m³) of the expanded molded article).

In the following case, moreover, an expanded molded article that is excellent in fusion bondability can be provided, by using a plasticizer having a particular structure (including an ester bond number and a molecular weight) and a particular boiling point, even though the polycarbonate-based resin does not have the peaks showing the particular molecular weights at the particular positions as described above.

An expanded molded article of a polycarbonate-based resin containing plural expanded particles containing a polycarbonate-based resin as a base resin, the expanded molded article containing a plasticizer having 2 or more ester bonds, a molecular weight of from 200 to 600, and a boiling point of from 250 to 500° C.

BRIEF DESCRIPTION OF DRAWINGS

FIG. 1 is a graph showing the results of the measurement with reactive pyrolysis GC/MS of the expanded particles of Example 1a and Example 1b.

FIG. 2 is a graph showing the results of the measurement with reactive pyrolysis GC/MS of the expanded particles of Example 2a.

FIG. 3 is a graph showing the results of the measurement with reactive pyrolysis GC/MS of the expanded particles of Example 3a.

FIG. 4 is a graph showing the results of the measurement with reactive pyrolysis GC/MS of the expanded particles of Example 2b.

FIG. 5 is a graph showing the results of the measurement with reactive pyrolysis GC/MS of the expanded particles of Example 1c.

FIG. 6 is the micrographs of the cut surfaces of the expanded particles of Example 1d.

FIG. 7 is the micrographs of the cut surfaces of the expanded particles of Example 2d.

FIG. 8 is the micrographs of the cut surfaces of the expanded particles of Example 3d.

FIG. 9 is the micrograph of the cut surface of the expanded molded article of Example 1d.

DESCRIPTION OF EMBODIMENTS (Expanded Particles of Polycarbonate-Based Resin)

The expanded particles of a polycarbonate-based resin (which may be hereinafter referred simply to as expanded particles) contain any one of the polycarbonate-based resins (a) to (c) containing a component derived from bisphenol A satisfying any one of the conditions (a) to (c) as a base resin.

Polycarbonate-Based Resin (a)

[Peak Derived from Molecular Weight of from 145 to 230]

The expanded particles show a peak derived from a molecular weight of from 145 to 230 in the GC/MS chart. The peak is observed at a retention time in a range of −15 minutes or less based on the retention time of the maximum peak showing the component derived from bisphenol A (which may be hereinafter referred to as a maximum peak). The GC/MS chart is obtained through measurement by a reactive pyrolysis GC/MS method utilizing reaction of methyl etherifying an ester bond contained in the polycarbonate-based resin through hydrolysis with tetramethylammonium hydroxide as a reaction reagent under condition of helium used as a carrier gas with a carrier gas flow rate of 34 mL/min.

The inventors surprisingly find that expanded particles capable of providing an expanded molded article of a polycarbonate-base resin (which may be hereinafter referred simply to as an expanded molded article) excellent in moldability and appearance can be provided, by observing the peak derived from a molecular weight of from 145 to 230 with a retention time in a range of −15 minutes or less based on the retention time of the maximum peak. The inventors presume the mechanism providing an expanded molded article excellent in moldability and appearance as follows.

Specifically, the peak derived from a molecular weight of from 145 to 230 shows the particular structure of the polycarbonate-based resin. The inventors have found that the polycarbonate-based resin having the particular structure corresponding to the peak provides an expanded molded article excellent in moldability and appearance in the working examples. The peak is attributable to the terminal structure of the polycarbonate-based resin. The terminal structure entangles the polymer chains constituting the polycarbonate-based resin, so as to provide a polycarbonate-based resin having voids formed of the plural polymer chains. The voids contribute to the enhancement of the retainability of the expanding agent to elongate the polymer chains, and to the dissipation of the expanding agent, thereby providing the expanded particles capable of providing an expanded molded article excellent in moldability in expanding and appearance.

The inventors presume that the peak derived from a molecular weight of from 145 to 230 is the terminal portion constituting the polycarbonate-based resin. Specifically, Lexan 153, manufactured by SABIC, used in the working examples has a peak derived from a molecular weight of from 210 to 230 observed at a retention time in a range of −15 minutes or less based on the retention time of the maximum peak. The inventors presume that the peak is attributable to 2-(1-methyl-1-phenylethyl)phenol. Panlite X0730, manufactured by Teijin Ltd., and Makrolon WB1439, manufactured by Bayer AG, used in the working examples each have a peak derived from a molecular weight of from 145 to 165 observed at a retention time in a range of −15 minutes or less based on the retention time of the maximum peak. The inventors presume that the peak is attributable to 1-(1,1-dimethylethyl)-4-methoxybenzene.

In the mass spectrum derived from the resulting GC/MS chart, the maximum peak showing the component derived from bisphenol A and the peak derived from a molecular weight of from 145 to 230 preferably have an area ratio of from 1/0.02 to 1/0.07. The area ratio of the peaks is attributable to the number of terminals and the number of repeating units of the main chain skeleton, and is a value influencing the mobility, the hardness, and the like of the polymer. In the case where the peak area ratio of the peak derived from a molecular weight of from 145 to 230 is less than 0.02, the motion of the polymer chain in expansion may slow down due to the large length of the polymer chain, thereby failing to perform the expansion favorably in some cases. In the case where the peak area ratio of the peak derived from a molecular weight of from 145 to 230 is larger than 0.07, the cells cannot withstand to the expansion of the expanding agent due to the small length of the polymer chain, and thus the cells may contract immediately after the expansion, thereby failing to perform the expansion favorably in some cases. The area ratio of the peak derived from a molecular weight of from 145 to 230 may be a value of 0.02, 0.03, 0.04, 0.05, 0.06, 0.065, or 0.07. The lower limit of the area ratio of the peak derived from a molecular weight of from 145 to 230 is more preferably 0.022, and further preferably 0.025. The upper limit of the area ratio of the peak derived from a molecular weight of from 145 to 230 is more preferably 0.065, and further preferably 0.060.

More specifically, the maximum peak showing the component derived from bisphenol A and the peak derived from a molecular weight of from 210 to 230 preferably have an area ratio of from 1/0.03 to 1/0.06. The area ratio of the peak derived from a molecular weight of from 210 to 230 may have a value of 0.03, 0.04, 0.05, or 0.06. The maximum peak showing the component derived from bisphenol A and the peak derived from a molecular weight of from 145 to 165 preferably have an area ratio of from 1/0.015 to 1/0.05. The area ratio of the peak derived from a molecular weight of from 145 to 165 may have a value of 0.015, 0.02, 0.03, 0.04, or 0.05.

[Peak Derived from Molecular Weight of from 320 to 350]

The expanded particles show a peak derived from a molecular weight of from 320 to 350 in the GC/MS chart. The peak is observed at a retention time in a range of +10 minutes or less based on the retention time of the maximum peak showing the component derived from bisphenol A (which may be hereinafter referred to as a maximum peak).

The inventors have surprisingly found that expanded particles capable of providing an expanded molded article excellent in moldability and appearance can be provided when the peak derived from a molecular weight of from 320 to 350 is observed at a retention time in a range of +10 minutes or less based on the retention time of the maximum peak, similar to the aforementioned case described for the peak derived from a molecular weight of from 145 to 230. The inventors presume the mechanism providing an expanded molded article excellent in moldability and appearance as follows.

Specifically, the peak derived from a molecular weight of from 320 to 350 shows the particular structure of the polycarbonate-based resin. The inventors have found that the polycarbonate-based resin having the particular structure corresponding to the peak provides an expanded molded article excellent in moldability and appearance in the working examples. The peak is attributable to the branched structure of the polycarbonate-based resin. It is presumed that the branched structure not only contributes to the gas dissipation during expansion, similar to the terminal structure, but also facilitates the entanglement of the molecules particularly during molding, and thereby the adhesiveness among the particles is significantly improved.

The inventors presume that the peak derived from a molecular weight of from 320 to 350 is the branched structure portion constituting the polycarbonate-based resin, and particularly is attributable to 2-tri(p-hydroxyphenyl) acetate.

In the mass spectrum derived from the resulting GC/MS chart, the maximum peak showing the component derived from bisphenol A and the peak derived from a molecular weight of from 320 to 350 preferably have an area ratio of from 1/0.005 to 1/0.05. The area ratio of the peaks is a value showing the extent of branching of the main chain skeleton, and is a value influencing the mobility of the polymer, the gas dissipation, and the entanglement of the molecules in molding. In the case where the peak area ratio of the peak derived from a molecular weight of from 320 to 350 is less than 0.005, the entanglement may be small due to the small extent of branching, thereby failing to perform the expansion favorably and failing to provide an expanded molded article favorably in some cases. In the case where the peak area ratio of the peak derived from a molecular weight of from 320 to 350 is larger than 0.05, due to the large amount of the branched structure, the polymer molecules may be difficult to separate from each other and difficult to move when the polymer is softened, thereby failing to perform the expansion favorably in some cases. The area ratio of the peak derived from a molecular weight of from 320 to 350 may be a value of 0.005, 0.008, 0.01, 0.02, 0.03, 0.04, 0.045, or 0.05. The lower limit of the area ratio of the peak derived from a molecular weight of from 320 to 350 is more preferably 0.008, and further preferably 0.01. The upper limit of the area ratio of the peak derived from a molecular weight of from 320 to 350 is more preferably 0.045, and further preferably 0.04.

Polycarbonate-Based Resin (b)

[Peak Derived from Molecular Weight of from 210 to 230]

The expanded particles show a peak derived from a molecular weight of from 210 to 230 in the GC/MS chart. The peak may be obtained through the measurement in the same manner as in the polycarbonate-based resin (a).

The inventors have surprisingly found that expanded particles capable of providing an expanded molded article excellent in moldability and appearance can be provided when the peak derived from a molecular weight of from 210 to 230 is observed at a retention time in a range of 5 minutes or less based on the retention time of the maximum peak. The inventors presume the mechanism providing an expanded molded article excellent in moldability and appearance as follows.

Specifically, the peak derived from a molecular weight of from 210 to 230 shows the particular structure of the polycarbonate-based resin. The inventors have found that the polycarbonate-based resin having the particular structure corresponding to the peak provides an expanded molded article excellent in moldability and appearance in the working examples. The peak is attributable to the terminal structure of the polycarbonate-based resin. The terminal structure entangles the polymer chains constituting the polycarbonate-based resin, so as to provide a polycarbonate-based resin having voids formed of the plural polymer chains. The voids contribute to the enhancement of the retainability of the expanding agent to elongate the polymer chains, and to the dissipation of the expanding agent, thereby providing the expanded particles capable of providing an expanded molded article excellent in moldability in expanding and appearance.

The inventors presume that the peak derived from a molecular weight of from 210 to 230 is the terminal portion constituting the polycarbonate-based resin, and in particular presume that the peak is attributable to 2-(1-methyl-1-phenylethyl)phenol or 4-t-butyl-2-phenylphenol.

In the mass spectrum derived from the resulting GC/MS chart, the maximum peak showing the component derived from bisphenol A and the peak derived from a molecular weight of from 210 to 230 preferably have an area ratio of from 1/0.01 to 1/0.07. The area ratio of the peaks is attributable to the number of terminals and the number of repeating units of the main chain skeleton, and is a value influencing the mobility, the hardness, and the like of the polymer. In the case where the peak area ratio of the peak derived from a molecular weight of from 210 to 230 is less than 0.01, the motion of the polymer chain in expansion may slow down due to the large length of the polymer chain, thereby failing to perform the expansion favorably in some cases. In the case where the peak area ratio of the peak derived from a molecular weight of from 210 to 230 is larger than 0.07, the cells cannot withstand to the expansion of the expanding agent due to the small length of the polymer chain, and thus the cells may contract immediately after the expansion, thereby failing to perform the expansion favorably in some cases. The area ratio of the peak derived from a molecular weight of from 210 to 230 may be a value of 0.01, 0.015, 0.02, 0.03, 0.04, 0.05, 0.06, or 0.07. The lower limit of the area ratio of the peak derived from a molecular weight of from 210 to 230 is more preferably 0.015, further preferably 0.02, and particularly preferably 0.03. The upper limit of the area ratio of the peak derived from a molecular weight of from 210 to 230 is more preferably 0.06.

Polycarbonate-Based Resin (c)

[Peak Derived from Molecular Weight of from 290 to 320]

The expanded particles show a peak derived from a molecular weight of from 290 to 320 in the GC/MS chart. The peak may be obtained through the measurement in the same manner as in the polycarbonate-based resin (a).

The inventors have surprisingly found that an expanded molded article excellent in moldability and appearance can be provided when the peak derived from a molecular weight of from 290 to 320 is observed at a retention time in a range of 5 minutes or less based on the retention time of the maximum peak. The inventors presume the mechanism providing an expanded molded article excellent in moldability and appearance as follows.

Specifically, the peak derived from a molecular weight of from 290 to 320 shows the particular structure of the polycarbonate-based resin. The inventors have found that the polycarbonate-based resin having the particular structure corresponding to the peak provides an expanded molded article excellent in moldability and appearance in the working examples. The peak is presumed to be attributable to the branched structure of the polycarbonate-based resin. The branched structure entangles the polymer chains constituting the polycarbonate-based resin, so as to provide a polycarbonate-based resin having voids formed of the plural polymer chains. The voids contribute to the enhancement of the retainability of the expanding agent to elongate the polymer chains, and to the dissipation of the expanding agent.

In the mass spectrum derived from the resulting GC/MS chart, the maximum peak showing the component derived from bisphenol A and the peak derived from a molecular weight of from 290 to 320 preferably have an area ratio of from 1/0.005 to 1/0.04. The area ratio of the peaks is attributable to the number of branching and the number of repeating units of the main chain skeleton, and is a value influencing the mobility, the hardness, and the like of the polymer. In the case where the peak area ratio of the peak derived from a molecular weight of from 290 to 320 is less than 0.005, the entanglement of the polymer in expansion may be small due to the small amount of the branched structure, thereby failing to provide an expanded molded article favorably in some cases. In the case where the peak area ratio of the peak derived from a molecular weight of from 290 to 320 is larger than 0.04, the polymer may be difficult to move in expansion due to the large amount of the branched structure, which may lead to the breakage and contraction of the cells, and the like, thereby failing to perform the expansion favorably and failing to provide a molded article in some cases. The area ratio of the peak derived from a molecular weight of from 290 to 320 may be a value of 0.005, 0.01, 0.015, 0.02, 0.03, or 0.04.

The upper limit of the area ratio of the peak is preferably 0.03, more preferably 0.02, and further preferably 0.015.

[Polycarbonate-Based Resin]

The polycarbonate-based resin preferably has a polyester structure of carbonic acid and a glycol or a dihydric phenol. The polycarbonate-based resin preferably has an aromatic skeleton from the standpoint of the further enhancement of the thermal resistance. Specific examples of the polycarbonate-based resin include a polycarbonate resin derived from a bisphenol, such as 2,2-bis(4-oxyphenyl)propane, 2,2-bis(4-oxyphenyl)butane, 1,1-bis(4-oxyphenyl)cyclohexane, 1,1-bis(4-oxyphenyl)butane, 1,1-bis(4-oxyphenyl)isobutane, and 1,1-bis(4-oxyphenyl)ethane.

Among these, (i) a resin having a component derived from 2-(1-methyl-1-phenylethyl)phenol or 1-(1,1-dimethylethyl)-4-methoxybenzene as a terminal portion and a component derived from 2-tri(p-hydroxyphenyl) acetate as a branched structure portion, and (ii) a resin having a component derived from 2-(1-methyl-1-phenylethyl)phenol or 4-t-butyl-2-phenylphenol as a terminal portion, each of which has a component derived from 2,2-bis(4-oxyphenyl)propane (trivial name: bisphenol A) as a basic skeleton, are preferred.

The polycarbonate-based resin may contain an additional resin other than the polycarbonate resin. Examples of the additional resin include an acrylic resin, a saturated polyester resin, an ABS resin, a polystyrene resin, and a polyphenylene oxide resin. A polycarbonate-based resin that does not have any of the aforementioned terminal structure and branched structure may be contained. The polycarbonate-based resin preferably contains the polycarbonate-based resin having the aforementioned terminal structure and branched structure in an amount of 50% by weight or more.

The polycarbonate-based resin preferably has an MFR of from 1 to 20 g/10 min. The resin within the range is suitable for expansion, and can be further highly expanded. The MFR is more preferably in a range of from 2 to 15 g/10 min.

The expanded particles may contain the polycarbonate-based resin as a basic resin and may have a particular cell density $X$. The cell density $X$ is a relatively high value as apparent from the comparison between Examples and Comparative Examples. The inventors find that the appearance and the fusion bondability of the expanded molded article can be enhanced by increasing the cell density $X$. The effect of enhancement can be exhibited even though the polycarbonate-based resin does not have the peaks showing the particular molecular weights at the particular positions as described above. The effect of enhancement can be further increase by having the peaks.

The cell density $X$ may be from $1.0 \times 10^8$ to $1.0 \times 10^{12}$ per cm$^3$. In the case where the cell density $X$ is less than $1.0 \times 10^8$ per cm$^3$, the cell membrane may become thick to decrease the secondary expandability before molding in some cases. In the case where the cell density $X$ is larger than $1.0 \times 10^{12}$ per cm$^3$, the cell membrane may become thin to facilitate the breakage of the cell membrane in expansion, providing continuous cells in some cases. The cell density $X$ may be a value of $1.0 \times 10^8$ per cm$^3$, $1.2 \times 10^8$ per cm$^3$, $1.5 \times 10^8$ per cm$^3$, $1.0 \times 10^9$ per cm$^3$, $1.0 \times 10^{10}$ per cm$^3$, $1.0 \times 10^{11}$ per cm$^3$, $5.0 \times 10^{11}$ per cm$^3$, or $1.0 \times 10^{12}$ per cm$^3$. The cell density $X$ is preferably from $1.2 \times 10^8$ to $5.0 \times 10^{11}$ per cm$^3$, and more preferably from $1.5 \times 10^8$ to $1.0 \times 10^{11}$ per cm$^3$.

The cell density $X$ can be calculated by the following expression:

$$\text{cell density } X = (\rho/D - 1) / \{(4/3) \cdot \pi \cdot (C/10/2)^3\}$$

wherein C represents an average cell diameter (mm); ρ represents a density (kg/m³) of the polycarbonate-based resin; and D represents an apparent density (kg/m³) of the expanded particles.

The average cell diameter C is preferably in a range of from 0.0030 to 0.2000 mm. The average cell diameter C may be a value of 0.0030 mm, 0.0034 mm, 0.0057 mm, 0.0100 mm, 0.0500 mm, 0.0850 mm, 0.0910 mm, 0.1000 mm, 0.1500 mm, 0.1800 mm, or 0.2000 mm. The average cell diameter C is more preferably from 0.0034 to 0.0910 mm, and the average cell diameter C is further preferably from 0.0057 to 0.0850 mm.

The density ρ of the polycarbonate-based resin is preferably in a range of from $1.0 \times 10^3$ to $1.4 \times 10^3$ kg/m³. In the case where the density ρ is less than $1.0 \times 10^3$ kg/m³, the thermal resistance temperature may be decreased in some cases. In the case where the density ρ is more than $1.4 \times 10^3$ kg/m³, the thermal resistance temperature is increased to make the expanding molding difficult in some cases. The density ρ may be a value of $1.0 \times 10^3$ kg/m³, $1.10 \times 10^3$ kg/m³, $1.15 \times 10^3$ kg/m³, $1.20 \times 10^3$ kg/m³, $1.30 \times 10^3$ kg/m³, $1.35 \times 10^3$ kg/m³, or $1.4 \times 10^3$ kg/m³. The density ρ is more preferably from $1.10 \times 10^3$ to $1.35 \times 10^3$ kg/m³, and the density ρ is further preferably from $1.15 \times 10^3$ to $1.30 \times 10^3$ kg/m³.

The apparent density D of the expanded particles is preferably in a range of from 12 to 600 kg/m³. In the case where the apparent density D is less than 12 kg/m³, the cell membrane may become thin, the cell membrane may be broken in secondary expansion, the proportion of the continuous cells may be increased, and the contraction or the like of the expanded particles due to buckling of the cells may occur in some cases. In the case where the apparent density D is more than 600 kg/m³, the cell membrane may become thick, and the secondary expandability may be deteriorated in some cases. The apparent density D may be a value of 12 kg/m³, 24 kg/m³, 30 kg/m³, 50 kg/m³, 100 kg/m³, 120 kg/m³, 240 kg/m³, or 600 kg/m³. The apparent density D is more preferably from 24 to 240 kg/m³, and the apparent density D is further preferably from 30 to 120 kg/m³.

[Shape of Expanded Particles]

The shape of the expanded particles is not particularly limited. Examples of the shape thereof include a spherical shape and a cylindrical shape. Among these, the shape thereof is preferably as close as possible to a spherical shape. In other words, the ratio of the minor diameter and the major diameter of the expanded particles is preferably as close as possible to 1.

The expanded particles may have various values for the bulk density. The bulk density is preferably 0.4 g/cm³ or less. The bulk density may be a value of 0.01 g/cm³, 0.012 g/cm³, 0.04 g/cm³, 0.06 g/cm³, 0.12 g/cm³, 0.3 g/cm³, or 0.4 g/cm³. The bulk density is more preferably from 0.010 to 0.12 g/cm³, further preferably from 0.012 to 0.12 g/cm³, and particularly preferably from 0.01 to 0.08 g/cm³. The bulk density may be 0.04 g/cm³ or more, and may be from 0.06 to 0.3 g/cm³.

The expanded particles preferably have an average particle diameter of from 1 to 20 mm.

[Manufacturing Method of Expanded Particles]

The expanded particles can be obtained by impregnating resin particles with an expanding agent to provide expandable particles, and expanding the expandable particles.

(1) Manufacture of Expandable Particles

The expandable particles can be obtained by impregnating resin particles made of the polycarbonate-based resin with an expanding agent.

The resin particles can be obtained by a known method. Examples thereof include a method, in which the polycarbonate-based resin is melt-kneaded along with additives depending on necessity in an extruder, and extruded therefrom into a strand, and the resulting strand is cut in air, cut under water, or cut under heating, so as to granulate the resin. The resin particles used may be commercially available resin particles. The resin particles may contain additives depending on necessity in addition to the resin. Examples of the additives include a plasticizer, a flame retardant, a flame retarding assistant, a binding inhibitor, an antistatic agent, a spreading agent, a cell stabilizer, a filler, a colorant, a weathering agent, an anti-aging agent, a lubricant, an anti-fogging agent, and a perfume.

The binding inhibitor (cohesion inhibitor) has a function inhibiting cohesion of the expanded particles in the expanding step. The cohesion referred herein means that the plural expanded particles are bonded and unified. Specific examples of the binding inhibitor include talc, calcium carbonate, and aluminum hydroxide.

Examples of the antistatic agent include polyoxyethylene alkyl phenol ether and stearic monoglyceride.

Examples of the spreading agent include polybutene, polyethylene glycol, and silicone oil.

The expanding agent, with which the resin particles are impregnated, may be a known volatile expanding agent or a known inorganic expanding agent. Examples of the volatile expanding agent include an aliphatic hydrocarbon, such as propane, butane, and pentane, an aromatic hydrocarbon, an alicyclic hydrocarbon, and an aliphatic alcohol. Examples of the inorganic expanding agent include carbon dioxide gas, nitrogen gas, and air. The expanding agent may be used as a combination of two or more kinds thereof. Among the expanding agents, an inorganic expanding agent is preferred, and carbon dioxide gas is more preferred.

The content (impregnation amount) of the expanding agent is preferably from 3 to 15 parts by weight per 100 parts by weight of the polycarbonate-based resin. In the case where the content of the expanding agent is less than 3 parts by weight, the expanding power may be lowered, thereby failing to perform the expansion favorably in some cases. In the case where the content thereof exceeds 15 parts by weight, the plasticization effect may be increased, and the contraction tends to occur in the expansion, thereby deteriorating the productivity and inhibiting the stable achievement of the desired expansion ratio in some cases. The content of the expanding agent is more preferably from 4 to 12 parts by weight.

Examples of the impregnation method include a wet impregnation method, in which the resin particles dispersed in an aqueous system under stirring are impregnated by feeding the expanding agent thereto under pressure, and a dry impregnation method (gas phase impregnation method) using substantially no water, in which the resin particles are placed in a sealable vessel and impregnated by feeding the expanding agent thereto under pressure. The dry impregnation method capable of performing the impregnation without the use of water is particularly preferred. The impregnation pressure, the impregnation time, and the impregnation temperature in the impregnation of the resin particles with the expanding agent are not particularly limited.

The impregnation pressure is preferably from 1 to 4.5 MPa from the standpoint of the efficient impregnation for providing more favorable expanded particles and expanded molded article.

The impregnation time is preferably from 0.5 to 200 hours. In the case where the impregnation time is less than 0.5 hour, the impregnation amount of the expanding agent to the resin particles may be lowered, thereby failing to provide sufficient expanding power in some cases. In the case where the impregnation time is longer than 200 hours, the productivity may be deteriorated in some cases. The impregnation time is more preferably from 1 to 100 hours.

The impregnation temperature is preferably from 0 to 60° C. In the case where the impregnation temperature is less than 0° C., sufficient expansion power (primary expansion power) may not be obtained since a sufficient impregnation amount cannot be ensured within a desired period of time in some cases. In the case where the impregnation temperature is more than 60° C., the productivity may be deteriorated in some cases. The impregnation temperature is more preferably from 5 to 50° C.

(2) Manufacture of Expanded Particles

The method of providing the expanded particles by expanding the expandable particles is preferably a method of expanding the expandable particles by heating with steam or the like.

A sealable pressure tight expanding vessel is preferably used in an expanding machine for expanding. The pressure of steam is preferably from 0.1 to 0.8 MPa (gauge pressure), more preferably from 0.2 to 0.5 MPa, and further preferably from 0.25 to 0.45 MPa. It suffices that the expanding time is such a period of time that is necessary for providing a desired expansion ratio. The expanding time is preferably from 5 to 180 seconds. In the expanding time exceeds 180 seconds, the expanded particles may start to contract in some cases, and an expanded molded article having favorable properties may not be obtained from the expanded particles in some cases.

In the manufacturing process of the expanded particles, the cell density X can be increased or decreased by controlling the impregnation condition (e.g., the impregnation pressure, the impregnation time, and the impregnation temperature) and the primary expanding condition (e.g., the expanding pressure and the expanding time).

(Expanded Molded Article)

The expanded molded article contains plural expanded particles, and the expanded particles contain any one of the polycarbonate-based resins (a) to (c) satisfying any one of the conditions (a) to (c) as a base resin. The expanded molded article can be generally manufactured from the aforementioned expanded particles.

Polycarbonate-Based Resin (a)

[Peaks Derived from Molecular Weight of from 145 to 230 and Molecular Weight of from 320 to 350]

The expanded molded article shows a peak derived from a molecular weight of from 145 to 230 in the GC/MS chart with the retention time as the abscissa. The peak is observed at a retention time in a range of −15 minutes or less based on the retention time of the maximum peak. In addition, the expanded molded article shows a peak derived from a molecular weight of from 320 to 350 in the GC/MS chart with the retention time as the abscissa. The peak is observed at a retention time in a range of +10 minutes or less based on the retention time of the maximum peak. The observation method is the same as that for the expanded particles.

Due to the same reason as in the expanded particles, in the mass spectrum derived from the resulting GC/MS chart, the maximum peak showing the component derived from bisphenol A and the peak derived from a molecular weight of from 145 to 230 preferably have an area ratio of from 1/0.02 to 1/0.07. The area ratio of the peak derived from a molecular weight of from 145 to 230 may be a value of 0.02, 0.03, 0.04, 0.05, 0.06, 0.065, or 0.07. The lower limit of the area ratio of the peak derived from a molecular weight of from 145 to 230 is more preferably 0.022, and further preferably 0.025. The upper limit of the area ratio of the peak derived from a molecular weight of from 145 to 230 is more preferably 0.065. In addition, the maximum peak showing the component derived from bisphenol A and the peak derived from a molecular weight of from 320 to 350 preferably have an area ratio of from 1/0.005 to 1/0.05. The area ratio of the peak derived from a molecular weight of from 320 to 350 may be a value of 0.005, 0.008, 0.01, 0.02, 0.03, 0.04, 0.045, or 0.05. The lower limit of the area ratio of the peak derived from a molecular weight of from 320 to 350 is more preferably 0.008, and further preferably 0.01. The upper limit of the area ratio of the peak derived from a molecular weight of from 320 to 350 is more preferably 0.045, and further preferably 0.04.

Polycarbonate-Based Resin (b)

[Peak Derived from Molecular Weight of from 210 to 230]

The expanded molded article shows a peak derived from a molecular weight of from 210 to 230 in the GC/MS chart with the retention time as the abscissa. The peak is observed at a retention time in a range of 5 minutes or less based on the retention time of the maximum peak. The observation method is the same as that for the expanded particles.

Due to the same reason as in the expanded particles, in the mass spectrum derived from the resulting GC/MS chart, the maximum peak showing the component derived from bisphenol A and the peak derived from a molecular weight of from 210 to 230 preferably have an area ratio of from 1/0.01 to 1/0.07. The area ratio of the peak derived from a molecular weight of from 210 to 230 may be a value of 0.01, 0.015, 0.02, 0.03, 0.04, 0.05, 0.06, or 0.07. The lower limit of the area ratio of the peak derived from a molecular weight of from 210 to 230 is more preferably 0.015, further preferably 0.02, and particularly preferably 0.03. The upper limit of the area ratio of the peak derived from a molecular weight of from 210 to 230 is more preferably 0.06.

Polycarbonate-Based Resin (c)

[Peak Derived from Molecular Weight of from 290 to 320]

The expanded molded article shows a peak derived from a molecular weight of from 290 to 320 in the GC/MS chart with the retention time as the abscissa. The peak is observed at a retention time in a range of 5 minutes or less based on the retention time of the maximum peak. The observation method is the same as that for the expanded particles.

Due to the same reason as in the expanded particles, in the mass spectrum derived from the resulting GC/MS chart, the maximum peak showing the component derived from bisphenol A and the peak derived from a molecular weight of from 290 to 320 preferably have an area ratio of from 1/0.005 to 1/0.04. The area ratio of the peak derived from a molecular weight of from 290 to 320 may be a value of 0.005, 0.01, 0.015, 0.02, 0.03, or 0.04. The upper limit of the area ratio of the peak derived from a molecular weight of from 290 to 320 is preferably 0.03, more preferably 0.02, and further preferably 0.015.

The expanded molded article may have the following particular cell density X.

The cell density X is calculated from the expanded particles constituting the expanded molded article. The cell density X can be calculated from the following expression as similar to the expanded particles:

$$\text{cell density } X = (\rho/D - 1) / \{(4/3) \cdot \pi \cdot (C/10/2)^3\}$$

wherein D represents an apparent density (kg/m$^3$) of the expanded molded article.

The cell density X may be from $1.0 \times 10^8$ to $1.0 \times 10^{12}$ per cm$^3$. The reason why the cell density X is in the particular range is the same as the reason for the expanded particles. The cell density X may be a value of $1.0 \times 10^8$ per cm$^3$, $1.2 \times 10^8$ per cm$^3$, $1.5 \times 10^8$ per cm$^3$, $1.0 \times 10^9$ per cm$^3$, $1.0 \times 10^{10}$ per cm$^3$, $1.0 \times 10^{11}$ per cm$^3$, $5.0 \times 10^{11}$ per cm$^3$, or $1.0 \times 10^{12}$ per cm$^3$. The preferred range and the more preferred range of the cell density X are the same as the ranges for the expanded particles respectively.

The preferred ranges and the reasons therefor, the more preferred ranges, and the further preferred ranges of the average cell diameter C and the density ρ of the polycarbonate-based resin are the same as those for the expanded particles respectively. The average cell diameter C may be a value of 0.0030 mm, 0.0034 mm, 0.0057 mm, 0.0100 mm, 0.0500 mm, 0.0850 mm, 0.0910 mm, 0.1000 mm, 0.1500 mm, 0.1800 mm, or 0.2000 mm.

The density D of the expanded molded article is preferably in a range of from 12 to 600 kg/m$^3$. In the case where the apparent density D is less than 12 kg/m$^3$, the cell membrane may become thin, the cell membrane may be broken in secondary expansion, and the proportion of the continuous cells may be increased, which may lead deterioration of the strength of the molded article in some cases. In the case where the apparent density D is more than 600 kg/m$^3$, the cell membrane may become thick, and the secondary expandability and the fusion bondability of the expanded particles in molding may be deteriorated in some cases. The apparent density D may be a value of 12 kg/m$^3$, 24 kg/m$^3$, 30 kg/m$^3$, 50 kg/m$^3$, 100 kg/m$^3$, 120 kg/m$^3$, 240 kg/m$^3$, or 600 kg/m$^3$. The apparent density D is more preferably from 24 to 240 kg/m$^3$, and the apparent density D is further preferably from 30 to 120 kg/m$^3$.

[Plasticizer]

The polycarbonate-based resin expanded molded article (which may be hereinafter referred simply to as an expanded molded article) contains plural expanded particles containing the polycarbonate-based resin as a base resin, and may contain a plasticizer having a particular structure and a particular boiling point. The plasticizer contained can provide an expanded molded particle having favorable fusion bondability. The effect of enhancement of the fusion bondability can be exhibited even though the polycarbonate-based resin does not have the peaks showing the particular molecular weights at the particular positions as described above. The effect of enhancement can be further increase by having the peaks.

The plasticizer has a function plasticizing the polycarbonate-based resin, and preferably has 2 or more ester bonds, a molecular weight of from 200 to 600, and a boiling point of from 250 to 500° C.

In the case where the number of ester bond is 1, the affinity thereof with the polycarbonate-based resin may be small, and the effect of enhancement of the fusion bondability may be insufficient in some cases. The upper limit of the number of ester bond is such a value that provides a molecular weight of from 200 to 600 and a boiling point of from 250 to 500° C. The number of ester bond is preferably from 2 to 4.

In the case where the molecular weight is less than 200, the impregnation thereof into the interior of the resin may be facilitated to provide an excessive plasticization effect, and the expanded molded article may readily contract in expansion and molding in some cases. In the case where the molecular weight is larger than 600, the viscosity of the plasticizer may be increased, and the plasticizer may be difficult to handle and may be difficult to provide a desired plasticizing effect in some cases. The molecular weight is more preferably from 220 to 500, and the molecular weight is further preferably from 230 to 450.

In the case where the boiling point is lower than 250° C., the plasticizer may be readily dissipated in the molding, thereby failing to provide the desired effect in some cases. In the case where the boiling point is higher than 500° C., the plasticizer may have high viscosity in some cases, and may be difficult to handle and may be difficult to provide a desired plasticizing effect in some cases. The boiling point may be a value of 250° C., 270° C., 280° C., 300° C., 350° C., 400° C., 450° C., or 500° C. The boiling point is more preferably from 270 to 500° C., and the boiling point is further preferably from 280 to 450° C.

The plasticizer is not particularly limited, as far as the plasticizer has the aforementioned structure and boiling point, and may be selected, for example, from an ester of an aliphatic polybasic carboxylic acid and an aliphatic monoalcohol, and an ester of an aliphatic polyhydric alcohol and an aliphatic monocarboxylic acid, and a compound having from 2 to 4 ester bonds is preferred. The plasticizer may be used solely or as a mixture of two or more kinds thereof.

Examples of the aliphatic polybasic carboxylic acid include an aliphatic dibasic carboxylic acid, such as oxalic acid, malonic acid, succinic acid, glutaric acid, adipic acid, pimelic acid, suberic acid, azelaic acid, and sebacic acid, an aliphatic tribasic carboxylic acid, such as propanetricarboxylic acid, butanetricarboxylic acid, and pentanetricarboxylic acid, and an aliphatic tetrabasic carboxylic acid, such as butanetetracarboxylic acid, pentanetetracarboxylic acid, and hexanetetracarboxylic acid. Examples of the aliphatic monoalcohol include methanol, ethanol, propanol, butanol, pentanol, hexanol, heptanol, octanol, nonanol, and decanol.

Examples of the aliphatic polyhydric alcohol include an aliphaticdihydric alcohol, such as ethylene glycol, propylene glycol, butanediol, pentanediol, and hexanediol, an aliphatic trihydric alcohol, such as glycerin and butanetriol, and an aliphatic tetrahydric alcohol, such as erythritol and pentaerythritol.

Examples of the aliphatic monocarboxylic acid include formic acid, acetic acid, propionic acid, butyric acid, valeric acid, lauric acid, myristic acid, palmitic acid, stearic acid, oleic acid, behenic acid, and a coconut fatty acid.

The aforementioned compounds exemplified for the aliphatic polybasic carboxylic acid, the aliphatic monoalcohol, the aliphatic polyhydric alcohol, and the aliphatic monocarboxylic acid include all variations for the positions, at which a carboxyl group and a hydroxyl group can be substituted, and include possible structural isomers for the hydrocarbon group (e.g., an alkyl group and an alkanediyl group).

Examples of the particularly preferred plasticizer include diisobutyl adipate and glycerin diacetate monolaurate.

Examples of an additional plasticizer include a polyhydric alcohol-based solvent, such as methanol, ethanol, isopropyl alcohol, and glycerin, and a hydrocarbon-based solvent, such as toluene and xylene, but the sufficient plasticization cannot be expected by the single use of the additional plasticizer. In the case where the additional plasticizer is used, the additional plasticizer is preferably used by mixing the plasticizer having 2 or more ester bonds, a molecular weight of from 200 to 600, and a boiling point of from 250 to 500° C. The content of the additional plasticizer is preferably 50% by weight or less based on the total amount of the plasticizers. The additional plasticizer may not be contained.

The plasticizer may exist in the interior of the expanded particles constituting the expanded molded article, may exist on the surface of the expanded particles, and may exist in both the interior and the surface of the expanded particles. The plasticizer preferably exists at least on the surface of the expanded particles from the standpoint of the enhancement of the fusion bondability.

The method used for attaching or the like the plasticizer to the expanded particles may be any of the known methods. Examples thereof include a method of spraying the plasticizer onto the expanded particles, a method of immersing the expanded particles in the plasticizer, and a method of dropping the plasticizer onto the expanded particles under stirring. In the method of immersing the expanded particles in the plasticizer, it is possible that the expanded particles are charged in a porous frame, such as a mesh-like frame or a punching plate, in advance, and the frame is immersed in a vessel filled with the plasticizer. These methods may be appropriately modified depending on the kind and the amount of the plasticizer used and the amount of the expanded particles.

The plasticizer may be attached in the form of undiluted liquid or may be attached after diluting with a solvent, such as water and an alcohol. The dilution increases the amount of the liquid and decreases the viscosity, and thereby the plasticizer can be uniformly attached even though the amount of the plasticizer is small. However, excessive dilution of the plasticizer may fail to provide the effect thereof due to the too small concentration, and may cause contraction of the expanded particles due to the penetration of the plasticizer to the interior of the expanded particles. Accordingly, the extent of the dilution may be appropriately changed depending on the kind and the amount of the plasticizer used.

[Shape of Expanded Molded Article]

The expanded molded article contains plural expanded particles. The expanded particles are fusion bonded to each other through the surfaces thereof. The expanded molded article enhanced in fusion bondability can be provided by the presence of the plasticizer.

The expanded molded article may have various values for the density. The density is preferably 0.4 g/cm$^3$ or less. The density may be a value of 0.01 g/cm$^3$, 0.012 g/cm$^3$, 0.04 g/cm$^3$, 0.06 g/cm$^3$, 0.12 g/cm$^3$, 0.3 g/cm$^3$, or 0.4 g/cm$^3$. The density is more preferably from 0.12 to 0.010 g/cm$^3$, and further preferably from 0.08 to 0.012 g/cm$^3$.

The expanded molded article may have various shapes depending on the purposes with no particular limitation. For example, the expanded molded article may have various shapes depending on such purposes as a building material (e.g., a civil engineering material and a house building material), a vehicle structural component, a structural component of a windmill or the like, a structural component of a helmet or the like, a packing material, and a core material of FRP as a composite component.

[Manufacturing Method of Expanded Molded Article]

The expanded molded article can be obtained, for example, by imparting an inner pressure to the expanded particles, and then subjecting the expanded particles to a molding step. In this case, the inventors find that the polycarbonate-based resins (a) to (c) have large expanding power from the expandable particles. Accordingly, the polycarbonate-based resins (a) to (c) are suitable not only for the general molding, in which an expanded molded article is provided from expandable particles through expanded particles, but also for so-called direct molding from particles, in which an expanded molded article is provided directly from expandable particles.

Before manufacturing the expanded molded article, it is preferred that the interior of the expanded particles is impregnated with an expanding agent to impart expanding power (secondary expanding power).

Examples of the impregnation method include a wet impregnation method, in which the resin particles dispersed in an aqueous system under stirring are impregnated by feeding the expanding agent thereto under pressure, and a dry impregnation method (gas phase impregnation method) using substantially no water, in which the expanded particles are placed in a sealable vessel and impregnated by feeding the expanding agent thereto under pressure. The dry impregnation method capable of performing the impregnation without the use of water is particularly preferred. The impregnation pressure, the impregnation time, and the impregnation temperature in the impregnation of the resin particles with the expanding agent are not particularly limited.

The expanding agent used may be the expanding agent used in the manufacture of the expanded particles. In the expanding agent, an inorganic expanding agent is preferably used. In particular, any one of nitrogen gas, air, an inert gas (such as helium and argon), and carbon dioxide gas, or a combination of two or more thereof is preferably used.

The pressure for imparting the inner pressure is desirably a pressure in such a range that the expanded particles are not collapsed, and the expanding power can be imparted. The pressure is preferably from 0.1 to 4 MPa, and more preferably from 0.3 to 3 MPa.

The impregnation time is preferably from 0.5 to 200 hours. In the case where the impregnation time is less than 0.5 hour, the amount of the expanding agent, with which the expanded particles are impregnated, may be too small, thereby failing to provide necessary secondary expanding power in some cases. In the case where the impregnation time is longer than 200 hours, the productivity may be deteriorated in some cases. The impregnation time is more preferably from 1 to 100 hours.

The impregnation temperature is preferably from 0 to 60° C. In the case where the impregnation temperature is less than 0° C., sufficient secondary expanding power may not be obtained with a desired period of time in some cases. In the case where the impregnation temperature is higher than 60° C., sufficient secondary expanding power may not be obtained with a desired period of time in some cases. The impregnation temperature is more preferably from 5 to 50° C.

The expanded particles having the inner pressure imparted may be fed to a molding cavity formed in a mold of an expansion molding machine, and then a heating medium may be introduced thereto to perform in-mold molding providing a desired expanded molded article. The expansion molding machine used may be an EPS molding machine used for manufacturing an expanded molded article from expanded particles of a polystyrene-based resin, a high-pressure molding machine used for manufacturing an expanded molded article from expanded particles of a polypropylene-based resin, or the like. The heating medium is demanded to be capable of imparting high energy within a short period of time, and the heating medium is preferably steam.

The pressure of steam is preferably from 0.2 to 0.5 MPa. The heating time is preferably from 10 to 300 seconds, and more preferably from 60 to 200 seconds. The heating time may be from 10 to 90 seconds, and also may be from 20 to 80 seconds.

The cell density X can be controlled by using the expanded particles having the aforementioned particular cell density X, and in addition, the cell density X can be increased by controlling the impregnation condition (e.g., the impregnation pressure, the impregnation time, and the impregnation temperature) and the primary expanding condition (e.g., the expanding pressure and the expanding time) in the manufacturing process of the expanded molded article. The cell density X can be decreased by controlling the impregnation condition (e.g., the impregnation pressure, the impregnation time, and the impregnation temperature) and the primary expanding condition (e.g., the expanding pressure and the expanding time).

EXAMPLES

The invention will be described specifically with reference to examples, but the invention is not limited thereto. The measurement methods for the prosperities in the examples are shown below.

[Measurement by Reactive Pyrolysis GC/MS Method]

A specimen of 0.05 to 0.3 mg was collected from the expanded particles or the expanded molded article, and weighed in Pyrofoil at a pyrolysis temperature of 445° C. 5 µL of a methanol solution containing 20% by weight of tetramethylammonium hydroxide pentahydrate (TMAH, reaction reagent) was added dropwise to the specimen, and then the specimen was dried and packed with the Pyrofoil to produce a pyrolysis specimen.

The pyrolysis specimen was subjected to a pyrolysis measurement with Curie Point Pyrolyzer, Model JHP-5 (manufactured by Japan Analytical Industry Co., Ltd.) and a gas chromatography mass spectrum analyzer, JMS-AX505H (manufactured by JEOL Ltd.: GC (HP-5890II)) as measurement equipments under the following measurement condition, and thereby a GC/MS chart (total ion chromatogram (TIC)) was obtained. In the GC/MS chart, the abscissa shows the retention time (unit: minute), and the ordinate shows the abundance.

Column: ZB-5 (0.25 µm×0.25 mm in diameter×30 m, manufactured by Phenomenex Inc.)

Measurement condition: Pyrofoil (heated to 445° C. for 5 seconds), oven temperature (280° C.), needle temperature (250° C.), column temperature (50° C. (3 minutes)→10° C./min→280° C.→40° C./min→320° C. (3 minutes)), measurement time (30 minutes), carrier gas (He), He flow rate (34 mL/min), inlet port temperature (300° C.), SEP temperature (280° C.), RSV temperature (80° C.), ionization current (100 µA), CD voltage (−10 kV)

In the resulting GC/MS chart, the peak of a molecular weight of from 145 (or 210) to 230 having the largest abundance among the molecular weights of the fragment ions by the electron impact ionization (EI) method was observed at a retention time of −15 minutes or less based on the retention time of the maximum abundance peak, the peak of a molecular weight of from 320 to 350 was observed at a retention time of +10 minutes or less in the same manner, and the peak of a molecular weight of from 290 to 320 having the largest abundance among the molecular weights of the fragment ions by the electron impact ionization (EI) method was observed at a retention time of 5 minutes or less in the same manner.

The molecular weight of the fragment ion was determined by the mass spectrum, in which the mass spectrum was exhibited for the peak within a range of −15 minutes or less, the peak within a range of +10 minutes or less, and the peak within a range of 5 minutes or less, based on the retention time of the maximum abundance peak, and the molecular weight of the fragment ion was determined. The maximum abundance peak was determined to be the methylated component of bisphenol A from the fragment ion.

The structure can be identified by searching the equipped library for the resulting mass spectrum. Examples of the library include NIST (mass spectrum database).

In the resulting GC/MS chart, the peak area (TIC peak area) was obtained for each of the maximum abundance peak, the peak derived from a molecular weight of from 145 (or 210) to 230, the peak derived from a molecular weight of from 320 to 350, and the peak derived from a molecular weight of from 290 to 320. The peak area ratios were obtained from the resulting peak areas according to the following expressions (1), (2), and (3).

(Peak area ratio derived from molecular weight of from 145 (or 210) to 230)=(peak area derived from molecular weight of from 145 (or 210) to 230)/(peak area derived from methylated component of bisphenol A)　　　Expression (1):

(Peak area ratio derived from molecular weight of from 320 to 350)=(peak area derived from molecular weight of from 320 to 350)/(peak area derived from methylated component of bisphenol A)　　　Expression (2):

(Peak area ratio derived from molecular weight of from 290 to 320)=(peak area derived from molecular weight of from 290 to 320)/(peak area derived from methylated component of bisphenol A)　　　Expression (3):

[Measurement of MFR]

The melt flow rate (MFR) was measured with "Semi-auto Melt Indexer 2A", manufactured by Toyo Seiki Seisaku-sho, Ltd., and measured according to the method B of (b) the method of measuring the time of movement of the piston within the prescribed distance of JIS K7210:1999 "Plastics—Test method for melt flow rate (MFR) and melt volume flow rate (MVR) of thermoplastics". Specifically, the measurement condition was a specimen of 3 to 8 g, a preheating time of 270 seconds, a load holding time of 30 seconds, a test temperature of 300° C., a test load of 11.77 N, and a piston movement distance (interval) of 25 mm. The number of the test was three, and the average thereof was designated as the value of melt flow rate (g/10 min). The test specimen used for the test was dried with a vacuum dryer under condition of 120° C. and a reduced pressure of 100 kPa for 5 hours.

[Measurement of Average Particle Diameter]

The average particle diameter is a value expressed by D50.

Specifically, using a Ro-Tap type sieve shaker (manufactured by SIEVE FACTORY IIDA CO., LTD.), approximately 25 g of the specimen was classified for 10 minutes with the JIS standard sieves (JIS Z8801:2006) having apertures of 26.5 mm, 22.4 mm, 19.0 mm, 16.0 mm, 13.2 mm, 11.20 mm, 9.50 mm, 8.80 mm, 6.70 mm, 5.66 mm, 4.76 mm, 4.00 mm, 3.35 mm, 2.80 mm, 2.36 mm, 2.00 mm, 1.70 mm, 1.40 mm, 1.18 mm, 1.00 mm, 0.85 mm, 0.71 mm, 0.60 mm, 0.50 mm, 0.425 mm, 0.355 mm, 0.300 mm, 0.250 mm, 0.212 mm, and 0.180 mm, and the weights of the specimens on the sieves were measured. A cumulative weight distribution curve was prepared from the results thus obtained, and the particle diameter at a cumulative weight of 50% (median diameter) was designated as the average particle diameter.

[Measurement of Average Cell Diameter of Expanded Particles]

The expanded particle obtained by the primary expanding was collected. The expanded particle was cut in an arbitrary direction, and a micrograph of the cut cross sectional surface was taken with a scanning electron microscope ("S-3400N", manufactured by Hitachi, Ltd.) with a magnification of from 10 to 200. The micrograph thus taken was printed on A4 paper, 10 cells were arbitrarily selected, and the average value was calculated. The value was designated as the average cell diameter.

[Measurement of Average Cell Diameter of Expanded Molded Article]

A piece of 50 mm in length×50 mm in width×30 mm in thickness was cut out from the center portion of the molded article of 400 mm in length×300 mm in width×30 mm in thickness, and a micrograph of the cross sectional surface in the thickness direction of the cut piece of the molded article was taken with a scanning electron microscope ("S-3400N", manufactured by Hitachi, Ltd.) with a magnification of from 10 to 200. The micrograph thus taken was printed on A4 paper, 10 cells were arbitrarily selected, and the average value was calculated. The value was designated as the average cell diameter.

[Measurement of Bulk Density and Apparent Density of Expanded Particles]

Approximately 1,000 cm$^3$ of the expanded particles were placed in a measuring cylinder to a scale of 1,000 cm$^3$. In viewing the measuring cylinder to the horizontal direction, the placement of the expanded particles was completed at the time when at least one of the expanded particles reached a scale of 1,000 cm$^3$. Subsequently, the weight of the expanded particles placed in the measuring cylinder was weighed with a significant digit of two places after the decimal point, and the mass thereof was shown by W g. The bulk density of the expanded particles was obtained by the following expression.

Bulk density (g/cm$^3$)=$W$/1000

The bulk expansion ratio is a value obtained by multiplying the inverse of the bulk density by the density (g/cm$^3$) of the polycarbonate-based resin.

The density of the polycarbonate-based resin can be measured by the method defined in ISO 1183:2004.

The apparent density was obtained by the following expression.

Apparent density (kg/m$^3$)=($W$×1000)/1000×(0.01)$^3$

The bulk expansion ratio is a value obtained by multiplying the inverse of the bulk density by the density (kg/m$^3$) of the polycarbonate-based resin.

[Measurement of Density of Expanded Molded Article]

A test piece (e.g., 75×300×30 mm) cut out from the expanded molded article (after molding, dried at 40° C. for 20 hours or more) was measured for the mass (a) and the volume (b) each for three or more significant digits, and the density (g/cm$^3$ or kg/m$^3$) of the expanded molded article was obtained from (a)/(b).

The expansion ratio is a value obtained by multiplying the inverse of the density by the density (g/cm$^3$ or kg/m$^3$) of the polycarbonate-based resin.

[Evaluation of Expandability of Examples 1a to 1c]

The case where the bulk expansion ratio of the primary expanded particles reached 20 times or more was evaluated as AA, the case where the bulk expansion ratio reached 15 times or more was evaluated as A.

[Evaluation of Moldability]

For the resulting expanded molded article, the expanded article of 300×400×30 (height) mm was held at the portion apart from the longer edge thereof by 20 mm with the surface of 300×400 mm directed upward, and the case where the molded article retained the shape thereof without fracture was evaluated as A.

[Evaluation of Molding Cycle]

The vacuum cooling time from the completion of heating in molding to the time when the expanding pressure of the expanded molded article per unit area became 0 kgf/cm$^2$ was evaluated by the following standard.

A: long period (41 seconds or more)
B: medium period (21 to 40 seconds)
C: short period (20 seconds or less)

The long period of time until the expanding pressure of the expanded molded article per unit area became 0 kgf/cm$^2$ immediately after heating means that the expanded particles have large expanding power, and consequently the fusion bondability among the expanded particles is large.

[Evaluation of Strength]

A steel ball of 1 kg was dropped on the expanded molded article from a height of 30 cm, and then the state of the expanded molded article was evaluated by the following standard.

A: The surface of the expanded molded article was dented, but the molded article was not broken.
B: The surface and the interior of the molded article were cracked, but the molded article was not broken.
C: The molded article was broken.

[Evaluation of Appearance]

The appearance was evaluated in the following manner. Specifically, a test piece having an outer skin of 50 mm×50 mm was cut out from the expanded molded article, and the number of particle intersections on the surface (outer skin surface) of the test piece was counted. The particle intersection referred herein means a contact point where three or more expanded particles are in contact with each other. Subsequently, the number of pinholes (dents) of the particle intersections was counted. The elongation of the expanded molded article was calculated from the number of the particle intersections and the number of the pinholes according to the following expression. The pinhole (dent) referred herein means a portion where the surface is dented by 2 mm or more from the surface which has been in contact with the mold during the manufacture of the expanded molded article, or the surface has a dent with a width of 2 mm or more (which is the width on the side of the surface in contact with the mold).

Elongation of expanded molded article=(1−(number of pinholes of particle intersections)/(total number of particle intersections))×5

The value of elongation thus calculated was evaluated by the following standard.

Appearance A: 4 or more (The surface was smooth. The expanded particles adhering to each other, and the shape of the expanded particles was difficult to determine.)

Appearance C: less than 4 (The surface had unevenness. The shape of the expanded particles was determined. The molded article was porous. The shape of the particles remained.)

[Evaluation of Moldability in Examples 1d to 3d]

The moldability was evaluated by the secondary expandability by the following standard. The secondary expandability was calculated by the following expression. The expansion ratio of the secondary expanded particles means the expansion ratio of the secondary expanded particles that is shown by heating the primary expanded particles after completing the internal pressure imparting step, with steam at 0.34 MPa for 30 seconds.

Secondary expansion ratio (times)=(expansion ratio of secondary expanded particles)/(expansion ratio of primary expanded particles)

A: 2 times or more
B: 1.5 to 2 times
C: 1.5 times or less

[Measurement of Fusion Bonding Rate]

A slit having a depth of approximately 1 mm was made on the expanded molded article with a cutter blade. Thereafter, the expanded molded article was divided into two pieces along the slit with hands or a hammer. For arbitrary 20 expanded particles exposed on the fracture surface, the number (a) of the particles that fractured within the interior of the particle was counted. The value obtained by substituting the counted value into the expression (a)×100/20 was designated as the fusion bonding rate (%). A fusion bonding rate of 50% or more was evaluated as A, and a fusion bonding rate of less than 50% was evaluated as C.

[Measurement of Amount of Plasticizer]

(a) Rikemal PL-012 and Vinycizer 40

The amount was measured as the amount of glycerin diacetate monolaurate or diisobutyl monolaurate.

(1) Extraction Method

Approximately 1.0 g of a freeze-dried specimen was weighed and collected directly to a cell container, and extracted by using Accelerated Solvent Extractor, ASE-350, manufactured by Dionex Corporation, under the following condition.

Extraction pressure: 10.5 MPa
Heating time: 5 minutes
Standing time: 10 minutes
Extraction temperature: 110° C.
Purge time: 90 seconds
Number of cycles: 3
Rinse amount: 10%
Extraction solvent: methanol
Time required: 45 minutes.

(2) Measurement Method for Rikemal PL-012

The accelerated solvent extracted liquid was placed in a measuring flask having a capacity of 50 mL, and after making the specified volume with methanol, was filtered with non-aqueous 0.20 μm Chromatodisc, and the filtrate was measured by HPLC. The measurement condition was as follows, and the concentration of Rikemal PL-012 in the specimen solution was obtained with the calibration curve from the standard peak area obtained from the chromatogram, from which the content thereof was calculated. The standard sample used for the calibration curve was Rikemal PL-012, manufactured by Riken Vitamin Co., Ltd.

(HPLC Measurement Condition)

Equipment: Liquid chromatography equipment, LC-10Avp (manufactured by Shimadzu Corporation)
Column: TSKgel ODS-80TS QA (4.6×150 mm), manufactured by Tosoh Corporation
Column temperature: 40° C.
Mobile phase: methanol
Flow rate of mobile phase: 0.7 mL/min
Pump temperature: room temperature
Measurement time: 10 minutes
Injection amount: 50 μL
Detector: Evaporative Light Scattering Detector ELSD-2000 (manufactured by Altech Associates, Inc.) (Detector Setting Condition)
Drift tube temperature: 60° C.
Gas flow: 1.6 mL/min
Gain: 1 (impactor: off)

(3) Measurement Method for Vinycizer 40

20 μL (1,000 ppm) of pyrene as the internal standard solution was placed in a 2 mL measuring flask, and after making the specified volume with the extracted liquid of the accelerated solvent extraction, analyzed by GC/MS under the following condition.

The concentration of diisobutyl adipate was calculated based on the calibration curve of diisobutyl adipate (6.15 ppm, 24.6 ppm, and 61.5 ppm) having been prepared in advance as the relative sensitivity of the peak area of diisobutyl adipate with respect to the peak area of pyrene as the internal standard substance in the resulting chromatogram. Furthermore, the content (% by weight) was calculated from the weight of the specimen and the amount of the extracted liquid according to the following expression.

Diisobutyl adipate amount (% by weight)=concentration in test liquid (μg/mL)×amount of extracted liquid 50 (mL)/weight of specimen (g)/10,000

(GC/MS Measurement Condition)

Measurement equipment: Gas Chromatograph-Mass Spectrometer QP2010SE, manufactured by Shimadzu Corporation
Column: ZB-5MS (0.25 μm×0.25 mm in diameter×30 m, manufactured by Phenomenex Inc.)
GC oven heating condition: initial temperature 70° C. (retained for 1 minute)
First stage heating rate: 15° C./min (up to 260° C., not retained)
Second stage heating rate: 10° C./min (up to 300° C.)
Final temperature: 300° C. (retained for 3 minutes)
Carrier gas: helium
Total flow rate, column flow rate: 52 mL/min, 1.02 mL/min
Column inlet pressure: 74.9 kPa
Detector: 1.00 kV
Injection port temperature: 300° C.
Interface temperature: 260° C.
Ion source temperature: 260° C.
Split ratio: 1/50 (internal standard method)
Injection of test liquid: 2 μL (using automatic sampler)
Measurement mode: SIM method (M/Z=129, 185, 200, 202)
Internal standard liquid: pyrene (b) Measurement of Additional Plasticizer It is necessary to modify appropriately the extraction method and the measurement method for determining the residual amount of the plasticizer from the specimen, depending on the species of the plasticizer. For example, the method using the Accelerated Solvent Extractor as similar to Rikemal PL-012 is suitable for the quantitative determination of an unidentified substance having a high boiling point. Furthermore, the measurement method selected may also be HPLC, GC/MS, and the like. The identification of a compound of an unidentified substance can be performed by IR, NMR, and the like. The determination of the residual amount is preferably performed by determining the concentration with a calibration curve prepared through the identification of the unidentified substance.

The following measurement method shows an analysis method by the GC/MS method for a known substance.

Method for measuring measurement specimen: A specimen was cut into cubes of approximately 2 mm, and precisely weighed for approximately 0.5 g in an HS vial, on which a septum and an aluminum cap were immediately placed and tightened with an aluminum cap tightener. The vial was heated in a thermostat chamber at 110° C. for 30 minutes, and 0.5 mL of the gas phase in the test vial was injected directly to the inlet port of GC for measuring the amount of the plasticizer.

Method for preparing standard: 5 μL each of the standard liquid 1,000 ppm methanol solutions each were placed in an HS vial, on which a septum and an aluminum cap were immediately placed and tightened with an aluminum cap tightener. The vial was heated in a thermostat chamber at 110° C. for 30 minutes, and 0.5 mL of the gas phase in the test vial was injected directly to the inlet port of GC for measurement.

The measurement condition was as follows, and the concentration was obtained from the calibration curve.
(GC/MS Measurement Condition)

Measurement equipment: Gas Chromatograph-Mass Spectrometer QP2010SE, manufactured by Shimadzu Corporation Column: ZB-5MS (0.25 μm×0.25 mm in diameter×30 m, manufactured by Phenomenex Inc.)

GC oven heating condition: initial temperature 70° C. (retained for 1 minute)

First stage heating rate: 15° C./min (up to 260° C., not retained)

Second stage heating rate: 10° C./min (up to 300° C.)

Final temperature: 300° C. (retained for 3 minutes)

Carrier gas: helium

Total flow rate, column flow rate: 52 mL/min, 1.02 mL/min

Column inlet pressure: 74.9 kPa

Detector: 1.00 kV

Injection port temperature: 300° C.

Interface temperature: 260° C.

Ion source temperature: 260° C.

Split ratio: 1/50 (internal standard method)

Injection of test liquid: 2 μL (using automatic sampler)

Measurement mode: SIM method (M/Z=129, 185, 200, 202)

Internal standard liquid: pyrene

Example 1a (Impregnating Step)

100 parts by weight (1,000 g) of Lexan 153 (manufactured by SABIC, density: 1.2 g/cm$^3$, MFR: 4 g/10 min, average particle diameter: 3 mm) as a polycarbonate-based resin was placed in a 10 L sealable pressure tight vessel, and the pressure in the pressure tight vessel was increased with carbon dioxide gas to a gauge pressure of 4 MPa and retained for 24 hours under an environment of room temperature (approximately 20° C.), so as to provide expandable particles.

(Expanding Step)

After completing the impregnation, the carbon dioxide gas in the pressure tight vessel was slowly released, and the expandable particles inside were taken out. Immediately, 0.3 part by weight (3 g) of calcium carbonate as a binding inhibitor was mixed with 100 parts by weight (1,000 g) of the expandable particles. Thereafter, the expandable particles were placed in a high-pressure expanding machine equipped with a stirrer, and expanded with steam of 0.34 MPa under stirring, so as to provide expanded particles (primary expanded particles) having a bulk expansion ratio of 18 (bulk density: 0.067 g/cm$^3$). The GC/MS chart obtained by measuring the resulting expanded particles by reactive pyrolysis GC/MS is shown in FIG. 1(a). In FIG. 1(a), A denotes the peak derived from a molecular weight of from 210 to 230, B denotes the maximum peak showing the component derived from bisphenol A, and C denotes the peak derived from a molecular weight of from 320 to 350. The mass spectra derived from the GC/MS chart are shown in FIGS. 1(b) to 1(g). FIG. 1(b) corresponds to the peak derived from a molecular weight of from 210 to 230, FIG. 1(d) corresponds to the maximum peak showing the component derived from bisphenol A, and FIG. 1(f) corresponds to the peak derived from a molecular weight of from 320 to 350. FIG. 1(c) shows a result obtained by searching the library for FIG. 1(b), FIG. 1(e) shows a result obtained by searching the library for FIG. 1(d), and FIG. 1(g) shows a result obtained by searching the library for FIG. 1(f).
(Second Impregnating Step, Internal Pressure Imparting Step)

The surface of the resulting expanded particles was rinsed with 0.01 N hydrochloric acid and dried, and then the expanded particles were placed in a 10 L pressure tight vessel, which was then sealed. The pressure in the sealed pressure tight vessel was increased with nitrogen gas to a gauge pressure of 1 MPa and allowed to stand for 24 hours, so as to impart internal pressure.
(Molding Step)

After imparting the internal pressure, the nitrogen gas in the pressure tight vessel was slowly released, and the expanded particles were taken out and immediately subjected to expansion molding with a high-pressure molding machine. The expanded particles were charged in a molding cavity having an internal dimension of 400 mm in length× 300 mm in width×30 mm in thickness, and heated by introducing steam of from 0.30 to 0.35 MPa for 50 seconds, followed by cooling, so as to provide an expanded molded article having an expansion ratio of 18 (density: 0.067 g/cm$^3$). The resulting expanded molded article was dried in a drying chamber at 30° C. for approximately 8 hours. The results obtained by measuring the expanded molded article by reactive pyrolysis GC/MS were the substantially same as FIGS. 1(a) to 1(g).

Example 2a

Expanded particles having a bulk expansion ratio of 24 and an expanded molded article having an expansion ratio of 24 were obtained in the same manner as in Example 1a except that Makrolon WB1439, manufactured by Bayer AG, (density: 1.2 g/cm$^3$, MFR: 3 g/10 min, average particle diameter: 3 mm) was used. The GC/MS chart obtained by measuring the resulting expanded particles by reactive pyrolysis GC/MS is shown in FIG. 2(a). In FIG. 2(a), A denotes the peak derived from a molecular weight of from 145 to 165, B denotes the maximum peak showing the component derived from bisphenol A, and C denotes the peak derived from a molecular weight of from 320 to 350. The mass spectra derived from the GC/MS chart are shown in FIGS. 2(b) to 2(g). FIG. 2(b) corresponds to the peak derived from a molecular weight of from 145 to 165, FIG. 2(d) corresponds to the maximum peak showing the component derived from bisphenol A, and FIG. 2(f) corresponds to the peak derived from a molecular weight of from 320 to 350. FIG. 2(c) shows a result obtained by searching the library for FIG. 2(b), FIG. 2(e) shows a result obtained by searching the library for FIG. 2(d), and FIG. 2(g) shows a result obtained by searching the library for FIG. 2(f). The results obtained by measuring the expanded molded article by reactive pyrolysis GC/MS were the substantially same as FIGS. 2(a) to 2(g).

Example 3a

Expanded particles having a bulk expansion ratio of 17 and an expanded molded article having an expansion ratio of 17 were obtained in the same manner as in Example 1a except that, as the polycarbonate-base resin, Panlite X0730, manufactured by Teijin Ltd., (density: 1.2 g/cm$^3$, MFR: 3.5 g/10 min, average particle diameter: 3 mm) was used. The GC/MS chart obtained by measuring the resulting expanded particles by reactive pyrolysis GC/MS is shown in FIG. 3(a). In FIG. 3(a), A denotes the peak derived from a molecular weight of from 145 to 165, B denotes the maximum peak showing the component derived from bisphenol A, and C denotes the peak derived from a molecular weight of from 320 to 350. The mass spectra derived from the GC/MS chart are shown in FIGS. 3(b) to 3(g). FIG. 3(b) corresponds to the peak derived from a molecular weight of from 145 to 165, FIG. 3(d) corresponds to the maximum peak showing the component derived from bisphenol A, and FIG. 3(f) corresponds to the peak derived from a molecular weight of from 320 to 350. FIG. 3(c) shows a result obtained by searching the library for FIG. 3(b), FIG. 3(e) shows a result obtained by searching the library for FIG. 3(d), and FIG. 3(g) shows a result obtained by searching the library for FIG. 3(f). The results obtained by measuring the expanded molded article by reactive pyrolysis GC/MS were the substantially same as FIGS. 3(a) to 3(g).

TABLE 1

| | Peak derived from molecular weight of from 145 to 230 | | Peak derived from molecular weight of from 320 to 350 | | Expandability | |
|---|---|---|---|---|---|---|
| | Presence | Area ratio | Presence | Area ratio | ratio/evaluation | Moldability |
| Example 1a | yes | 0.054 | yes | 0.017 | 18/A | A |
| Example 2a | yes | 0.026 | yes | 0.013 | 24/A | AA |
| Example 3a | yes | 0.043 | yes | 0.034 | 17/A | A |

It is understood from Table 1 that an expanded molded article having a peak derived from a molecular weight of from 145 to 230 observed at a retention time in a range of −15 minutes or less, and a peak derived from a molecular weight of from 320 to 350 observed at a retention time in a range of +10 minutes or less, based on the retention time of the maximum peak of bisphenol A, is excellent in moldability and expandability (appearance).

Example 1b (Impregnating Step)

100 parts by weight (1,000 g) of Lexan 153 (manufactured by SABIC, density: 1.2 g/cm$^3$, MFR: 4 g/10 min, average particle diameter: 3 mm) as a polycarbonate-based resin was placed in a 10 L sealable pressure tight vessel, and the pressure in the pressure tight vessel was increased with carbon dioxide gas to a gauge pressure of 4 MPa and retained for 24 hours under an environment of room temperature (approximately 20° C.), so as to provide expandable particles.

(Expanding Step)

After completing the impregnation, the carbon dioxide gas in the pressure tight vessel was slowly released, and the expandable particles inside were taken out. Immediately, 0.3 part by weight (3 g) of calcium carbonate as a binding inhibitor was mixed with 100 parts by weight (1,000 g) of the expandable particles. Thereafter, the expandable particles were placed in a high-pressure expanding machine equipped with a stirrer, and expanded with steam of 0.34 MPa under stirring, so as to provide expanded particles (primary expanded particles) having a bulk expansion ratio of 18 (bulk density: 0.067 g/cm$^3$). The GC/MS chart obtained by measuring the resulting expanded particles by reactive pyrolysis GC/MS is shown in FIG. 1(a). In FIG. 1(a), A denotes the peak derived from a molecular weight of from 210 to 230, and B denotes the maximum peak showing the component derived from bisphenol A. The mass spectra derived from the GC/MS chart are shown in FIGS. 1(b) to 1(e). FIG. 1(b) corresponds to the peak derived from a molecular weight of from 210 to 230, and FIG. 1(d) corresponds to the maximum peak showing the component derived from bisphenol A. FIG. 1(c) shows a result obtained by searching the library for FIG. 1(b), and FIG. 1(e) shows a result obtained by searching the library for FIG. 1(d).

(Second Impregnating Step, Internal Pressure Imparting Step)

The surface of the resulting expanded particles was rinsed with 0.01 N hydrochloric acid and dried, and then the expanded particles were placed in a 10 L pressure tight vessel, which was then sealed. The pressure in the sealed pressure tight vessel was increased with nitrogen gas to a gauge pressure of 1 MPa and allowed to stand for 24 hours, so as to impart internal pressure.

(Molding Step)

After imparting the internal pressure, the nitrogen gas in the pressure tight vessel was slowly released, and the expanded particles were taken out and immediately subjected to expansion molding with a high-pressure molding machine. The expanded particles were charged in a molding cavity having an internal dimension of 400 mm in length× 300 mm in width×30 mm in thickness, and heated by introducing steam of from 0.30 to 0.35 MPa for 50 seconds, followed by cooling, so as to provide an expanded molded article having an expansion ratio of 18 (density: 0.067 g/cm$^3$). The resulting expanded molded article was dried in a drying chamber at 30° C. for approximately 8 hours. The results obtained by measuring the expanded molded article by reactive pyrolysis GC/MS were the substantially same as FIGS. 1(a) to 1(e).

Example 2b

Expanded particles (expansion ratio: 16, bulk density: 0.075 g/cm$^3$) was obtained in the same manner as in Example 1b except that the polycarbonate-based resin was changed to Lexan 131 (manufactured by SABIC, density: 1.2 g/cm$^3$, MFR: 3.5 g/10 min).

The results obtained by measuring the expanded particles (primary expanded particles, bulk expansion ratio: 16, bulk density: 0.075 g/cm³) by reactive pyrolysis GC/MC is shown in FIGS. 4(a) to 4(e). The results obtained by measuring the expanded molded article by reactive pyrolysis GC/MS were the substantially same as FIGS. 4(a) to 4(e).

TABLE 2

| | Presence of peak | Peak area ratio | Expandability ratio/evaluation | Moldability |
|---|---|---|---|---|
| Example 1b | yes | 0.054 | 18/A | A |
| Example 2b | yes | 0.040 | 16/A | A |

It is understood from Table 2 that an expanded molded article having a peak derived from a molecular weight of from 210 to 230 observed at a retention time in a range of 5 minutes or less based on the retention time of the maximum peak of bisphenol A is excellent in moldability and expandability (appearance).

Example 1c (Impregnating Step)
100 parts by weight (1,000 g) of Novarex M7027U (manufactured by Mitsubishi Engineering-Plastics Corporation, MFR: 5 g/10 min, average particle diameter: 3 mm) as a polycarbonate-based resin was placed in a 10 L sealable pressure tight vessel, and the pressure in the pressure tight vessel was increased with carbon dioxide gas to a gauge pressure of 4 MPa and retained for 24 hours under an environment of room temperature (approximately 20° C.), so as to provide expandable particles.
(Expandability Determining Step)
After completing the impregnation, the carbon dioxide gas in the pressure tight vessel was slowly released, and the expandable particles inside were taken out. Immediately, 0.3 part by weight (3 g) of calcium carbonate as a binding inhibitor was mixed with 100 parts by weight (1,000 g) of the expandable particles. Thereafter, the expandable particles were placed in an expanding machine capable of having high-pressure steam introduced and discharged, and expanded by heating with steam of 0.30 MPa for 120 seconds. The resulting expanded particles had a bulk expansion ratio of 30 (bulk density: 0.04 g/cm³). The GC/MS chart obtained by measuring the resulting expanded particles by reactive pyrolysis GC/MS is shown in FIG. 5(a). In FIG. 5(a), A denotes the peak derived from a molecular weight of from 290 to 320, and B denotes the maximum peak showing the component derived from bisphenol A. The mass spectra derived from the GC/MS chart are shown in FIGS. 5(b) to 5(d). FIG. 5(b) corresponds to the peak derived from a molecular weight of from 290 to 320, and FIG. 5(c) corresponds to the maximum peak showing the component derived from bisphenol A. FIG. 5(d) shows a result obtained by searching the library for FIG. 5(c).
(Molding Step)
4.8 g of the expandable particles were charged in a molding cavity of 40 mm in length×80 mm in width×25 mm in thickness and a capacity of 80 cm³, and heated by introducing steam of from 0.30 to 0.35 MPa for 120 seconds, followed by cooling, so as to provide a self-standing expanded molded article having an expansion ratio of 20 (density: 0.06 g/cm³). The resulting expanded molded article was dried in a drying chamber at 30° C. for approximately 8 hours. The results obtained by measuring the expanded molded article by reactive pyrolysis GC/MS were the substantially same as FIGS. 5(a) to 5(d).

TABLE 3

| | Presence of peak derived from molecular weight of from 290 to 320 | Peak area ratio | Expandability ratio/evaluation |
|---|---|---|---|
| Example 1c | yes | 0.008 | 30/AA |

It is understood from Table 3 that an expanded molded article having a peak derived from a molecular weight of from 290 to 320 observed at a retention time in a range of 5 minutes or less based on the retention time of the maximum peak of bisphenol A is excellent in moldability and expandability (appearance).

Example 1d (Impregnating Step)
100 parts by weight (1,000 g) of Lexan 153 (manufactured by SABIC, density: 1.2×10³ kg/m³, MFR: 4 g/10 min, average particle diameter: 3 mm) as a polycarbonate-based resin was placed in a 10 L sealable pressure tight vessel, and the pressure in the pressure tight vessel was increased with carbon dioxide gas to a gauge pressure of 4 MPa and retained at 20° C. for 24 hours, so as to provide expandable particles.
(Expanding Step)
After completing the impregnation, the carbon dioxide gas in the pressure tight vessel was slowly released, and the expandable particles inside were taken out. Immediately, 0.3 part by weight (3 g) of calcium carbonate as a binding inhibitor was mixed with 100 parts by weight (1,000 g) of the expandable particles. Thereafter, the expandable particles were placed in a high-pressure expanding machine equipped with a stirrer, and expanded with steam of 0.34 MPa for 120 seconds under stirring, so as to provide expanded particles (average particle diameter: 6 mm, primary expanded particles) having a bulk expansion ratio of 23 (apparent density: 52 kg/m³).
(Second Impregnating Step, Internal Pressure Imparting Step)
The surface of the resulting expanded particles was rinsed with 0.01 N hydrochloric acid and dried, and then the expanded particles were placed in a 10 L pressure tight vessel, which was then sealed. The pressure in the sealed pressure tight vessel was increased with nitrogen gas to a gauge pressure of 1 MPa and allowed to stand for 24 hours at from 0 to 20° C., so as to impart internal pressure, thereby providing expanded particles (secondary expanded particles).
(Molding Step)
After imparting the internal pressure, the nitrogen gas in the pressure tight vessel was slowly released, and the expanded particles were taken out and immediately subjected to expansion molding with a high-pressure molding machine. The expanded particles were charged in a molding cavity having an internal dimension of 400 mm in length× 300 mm in width×30 mm in thickness, heated by introducing steam of from 0.30 to 0.35 MPa for 60 seconds, allowed to cool for 1 second, then cooled with water for 10 seconds, and cooled in vacuum in the molding cavity, so as to provide an expanded molded article having an expansion ratio of 16 (density: 75 kg/m³).

Example 2d

Primary expanded particles (average particle diameter: 5 mm) having a bulk expansion ratio of 16 (apparent density: 75 kg/m$^3$) and an expanded molded article having an expansion ratio of 14 (density: 86 kg/m$^3$) were obtained in the same manner as in Example 1d except that Lexan 121R, manufactured by SABIC (density: 1.2×10$^3$ kg/m$^3$, MFR: 15 g/10 min, average particle diameter: 3 mm) was used as the polycarbonate-based resin.

Primary expanded particles (average particle diameter: 6 mm) having a bulk expansion ratio of 21 (apparent density: 57 kg/m$^3$) and an expanded molded article having an expansion ratio of 20 (density: 60 kg/m$^3$) were obtained in the same manner as in Example 1d except that Makrolon WB1439, manufactured by Bayer AG (density: 1.2×10$^3$ kg/m$^3$, MFR: 3 g/10 min, average particle diameter: 3 mm) was used as the polycarbonate-based resin.

The average cell diameter C, the density ρ of the polycarbonate-based resin, the apparent density D of the primary expanded particles, the density D of the expanded molded article, the cell density X, the evaluation of molding cycle, the evaluation of strength, the evaluation of appearance, and the evaluation of moldability of Examples and Comparative Examples are shown in Table 4.

The micrographs and enlarged micrographs of the cut surfaces of the expanded particles of the examples are shown in FIGS. 6(a) to 8(b).

FIG. 6(a), FIG. 7(a), FIG. 8(a) are micrographs of with a magnification of 10 of Example 1d, Example 2d, and Example 3d, respectively.

FIG. 6(b) is a micrograph with a magnification of 80 of Example 1d, FIG. 7(b) is a micrograph with a magnification of 150 of Example 2d, FIG. 8(b) is a micrograph with a magnification of 150 of Example 3d, and FIG. 9 is a micrograph with a magnification of 200 of Example 1d.

was placed in a 10 L sealable pressure tight vessel, and the pressure in the pressure tight vessel was increased with carbon dioxide gas to a gauge pressure of 4 MPa and retained under an environment of room temperature (25° C.) for 24 hours, so as to provide expandable particles.

(Expanding Step)

After completing the impregnation, the carbon dioxide gas in the pressure tight vessel was slowly released, and the expandable particles inside were taken out. Immediately, 0.3 part by weight (3 g) of calcium carbonate as a binding inhibitor was mixed with 100 parts by weight (1,000 g) of the expandable particles. Thereafter, the expandable particles were placed in a high-pressure expanding machine equipped with a stirrer, and expanded with steam of 0.34 MPa under stirring, so as to provide a bulk density of 0.08 g/cm$^3$.

(Second Impregnating Step, Internal Pressure Imparting Step)

The surface of the resulting expanded particles was rinsed with 0.01 N hydrochloric acid and dried, and then 100 parts by weight (500 g) of the expanded particles were placed in a 10 L pressure tight vessel, which was then sealed. The pressure in the sealed pressure tight vessel was increased with nitrogen gas to a gauge pressure of 1 MPa and allowed to stand for 24 hours, so as to impart internal pressure.

(Molding Step)

After imparting the internal pressure, the nitrogen gas in the pressure tight vessel was slowly released, and the expanded particles were taken out, and 100 parts by weight (500 g) of the expanded particles and 1 part by weight (5 g) of Rikemal PL-012, produced by Riken Vitamin Co., Ltd., (glycerin diacetate monolaurate) were placed in a plastic bag and well mixed by shaking vertically 20 times, and then subjected to expansion molding with a high-pressure molding machine. The expanded particles were charged in a molding cavity having an internal dimension of 400 mm in length×300 mm in width×30 mm in thickness, and heated by introducing steam of from 0.30 to 0.35 MPa for 50 seconds, followed by cooling, so as to provide an expanded molded article. The resulting expanded molded article was dried in a drying chamber at 30° C. for approximately 8 hours, and exhibited a density of 0.08 g/cm$^3$.

TABLE 4

|  |  | Example | | |
| --- | --- | --- | --- | --- |
|  |  | 1d | 2d | 3d |
| Density ρ of polycarbonate-based resin (kg/m$^3$) | | 1.2 × 10$^3$ | 1.2 × 10$^3$ | 1.2 × 10$^3$ |
| Primary expanded particles | Average cell diameter C (mm) | 0.060 | 0.016 | 0.032 |
|  | Apparent density D (kg/m$^3$) | 52 | 75 | 57 |
|  | Cell density X (per cm$^3$) | 1.9 × 10$^8$ | 7.0 × 10$^9$ | 1.2 × 10$^9$ |
| Expanded molded article | Average cell diameter C (mm) | 0.041 | 0.016 | 0.031 |
|  | Apparent density D (kg/m$^3$) | 75 | 86 | 60 |
|  | Cell density X (per cm$^3$) | 4.2 × 10$^8$ | 6.1 × 10$^9$ | 1.2 × 10$^9$ |
| Moldability | Secondary expansion power (times/evaluation) | 2.5/A | 2.1/A | 2.5/A |
|  | Molding cycle (second/evaluation) | 140/A | 90/A | 160/A |
|  | Appearance (number/evaluation) | 5/A | 4/A | 5/A |
|  | Strength (evaluation) | A | A | A |

It is understood from Table 4 that an expanded molded article excellent in appearance and fusion bondability can be obtained by controlling the cell density X to the particular range.

Example 1e (Impregnating Step)

100 parts by weight (1,000 g) of a polycarbonate-based resin (Lexan 153, manufactured by SABIC (density: 1.2 g/cm$^3$, MFR: 4 g/10 min, average particle diameter: 3 mm)

Example 2e

An expanded molded article was obtained in the same manner as in Example 1e except that the plasticizer was changed to Vinycizer 40 (manufactured by Kao Corporation, diisobutyl adipate), and the amount of the plasticizer added was changed to 2.5 parts by weight (12.5 g).

The resulting expanded particles had a bulk density of 0.08 g/cm$^3$, and the expanded molded article had a density of 0.08 g/cm$^3$.

Example 3e

An expanded molded article was obtained in the same manner as in Example 1e except that the amount of the plasticizer added was changed to 2.5 parts by weight (12.5 g).

The resulting expanded particles had a bulk density of 0.08 g/cm$^3$, and the expanded molded article had a density of 0.08 g/cm$^3$.

Example 4e

An expanded molded article was obtained in the same manner as in Example 1e except that the amount of the plasticizer added was changed to 5 parts by weight (25 g).

The resulting expanded particles had a bulk density of 0.08 g/cm$^3$, and the expanded molded article had a density of 0.08 g/cm$^3$.

TABLE 5

| | Plasticizer | | | | Expanded molded article | |
|---|---|---|---|---|---|---|
| | Kind | Number of ester bond | Molecular weight | Boiling point (° C.) | Amount added (part by weight) | Amount of plasticizer (ppm) | Fusion bondability (%)/evaluation |
| Example 1e | PL-012 | 3 | 358 | 401 | 1 | 6,000 | 60/A |
| Example 2e | Vinycizer 40 | 4 | 258 | 293 | 2.5 | 9,000 | 65/A |
| Example 3e | PL-012 | 3 | 358 | 401 | 2.5 | 14,000 | 95/A |
| Example 4e | PL-012 | 3 | 358 | 401 | 5 | 37,000 | 95/A |

(note 1)
lower measurement limit (1 ppm) or less

It is understood from the table that an expanded molded article containing a plasticizer having 2 or more ester bonds, a molecular weight of from 200 to 600, and a boiling point of from 250 to 500° C. is excellent in fusion bondability.

The invention claimed is:

1. Expanded particles of a polycarbonate-based resin comprising, as a base resin, a polycarbonate-based resin containing a component derived from bisphenol A,
the expanded particles satisfying any one of the following conditions (a) to (c) in a GC/MS chart with a retention time as an abscissa obtained through measurement by a reactive pyrolysis GC/MS method utilizing reaction of methyl etherifying an ester bond contained in the polycarbonate-based resin through hydrolysis with tetramethylammonium hydroxide as a reaction reagent under condition of helium used as a carrier gas with a carrier gas flow rate of 34 mL/min:
(a) a peak derived from a molecular weight of from 145 to 230 and a peak derived from a molecular weight of from 320 to 350 are shown,
the peak derived from a molecular weight of from 145 to 230 is observed at a retention time in a range of −15 minutes or less based on a retention time of a maximum peak showing the component derived from bisphenol A, and
the peak derived from a molecular weight of from 320 to 350 is observed at a retention time in a range of +10 minutes or less based on a retention time of a maximum peak showing the component derived from bisphenol A;
(b) a peak derived from a molecular weight of from 210 to 230 is shown, and
the peak derived from a molecular weight of from 210 to 230 is observed at a retention time in a range of 5 minutes or less based on a retention time of a maximum peak showing the component derived from bisphenol A; and
(c) a peak derived from a molecular weight of from 290 to 320 is shown, and
the peak derived from a molecular weight of from 290 to 320 is observed at a retention time in a range of 5 minutes or less based on a retention time of a maximum peak showing the component derived from bisphenol A.

2. The expanded particles of a polycarbonate-based resin according to claim 1, wherein the peak derived from a molecular weight of from 145 to 230 is derived from a terminal portion constituting the polycarbonate-based resin, and the peak derived from a molecular weight of from 320 to 350 is derived from a branched structure portion constituting the polycarbonate-based resin.

3. The expanded particles of a polycarbonate-based resin according to claim 1, wherein the maximum peak showing the component derived from bisphenol A and the peak derived from a molecular weight of from 145 to 230 have an area ratio of from 1/0.02 to 1/0.07, and the maximum peak showing the component derived from bisphenol A and the peak derived from a molecular weight of from 320 to 350 have an area ratio of from 1/0.005 to 1/0.05.

4. The expanded particles of a polycarbonate-based resin according to claim 1, wherein the peak derived from a molecular weight of from 210 to 230 is derived from a terminal portion constituting the polycarbonate-based resin.

5. The expanded particles of a polycarbonate-based resin according to claim 1, wherein the maximum peak showing the component derived from bisphenol A and the peak derived from a molecular weight of from 210 to 230 have an area ratio of from 1/0.01 to 1/0.07.

6. The expanded particles of a polycarbonate-based resin according to claim 1, wherein the maximum peak showing the component derived from bisphenol A and the peak derived from a molecular weight of from 290 to 320 have an area ratio of from 1/0.005 to 1/0.04.

7. The expanded particles of a polycarbonate-based resin according to claim 1, wherein the expanded particles have a bulk density of 0.08 g/cm$^3$ or less.

8. The expanded particles according to claim 1, wherein the expanded particles have a cell density X of from $1.0\times10^8$ to $1.0\times10^{12}$ per cm$^3$ (wherein the cell density X is calculated by the following expression:

$$\text{cell density } X = (\rho/D-1)/\{(4/3)\cdot\pi\cdot(C/10/2)^3\}$$

wherein C represents an average cell diameter (mm); $\rho$ represents a density (kg/m$^3$) of the polycarbonate-based resin; and D represents an apparent density (kg/m$^3$) of the expanded particles).

9. The expanded particles according to claim 8, wherein the average cell diameter is from 0.0030 to 0.2000 mm, the density of the polycarbonate-based resin is from $1.0\times10^3$ to $1.4\times10^3$ kg/m$^3$, and the apparent density of the expanded particles is from 12 to 600 kg/m$^3$.

10. An expanded molded article of a polycarbonate-based resin comprising plural expanded particles,
the expanded particles comprising, as a base resin, a polycarbonate-based resin containing a component derived from bisphenol A,
the expanded molded article satisfying any one of the following conditions (a) to (c) in a GC/MS chart with a retention time as an abscissa obtained through measurement by a reactive pyrolysis GC/MS method utilizing reaction of methyl etherifying an ester bond contained in the polycarbonate-based resin through hydrolysis with tetramethylammonium hydroxide as a reaction reagent under condition of helium used as a carrier gas with a carrier gas flow rate of 34 mL/min:
(a) a peak derived from a molecular weight of from 145 to 230 and a peak derived from a molecular weight of from 320 to 350 are shown,
the peak derived from a molecular weight of from 145 to 230 is observed at a retention time in a range of −15 minutes or less based on a retention time of a maximum peak showing the component derived from bisphenol A, and
the peak derived from a molecular weight of from 320 to 350 is observed at a retention time in a range of +10 minutes or less based on a retention time of a maximum peak showing the component derived from bisphenol A;
(b) a peak derived from a molecular weight of from 210 to 230 is shown, and
the peak derived from a molecular weight of from 210 to 230 is observed at a retention time in a range of 5 minutes or less based on a retention time of a maximum peak showing the component derived from bisphenol A; and
(c) a peak derived from a molecular weight of from 290 to 320 is shown, and
the peak derived from a molecular weight of from 290 to 320 is observed at a retention time in a range of 5 minutes or less based on a retention time of a maximum peak showing the component derived from bisphenol A.

11. The expanded molded article of a polycarbonate-based resin according to claim 10, wherein the peak derived from a molecular weight of from 145 to 230 is derived from a terminal portion constituting the polycarbonate-based resin, and the peak derived from a molecular weight of from 320 to 350 is derived from a branched structure portion constituting the polycarbonate-based resin.

12. The expanded molded article of a polycarbonate-based resin according to claim 10, wherein the maximum peak showing the component derived from bisphenol A and the peak derived from a molecular weight of from 145 to 230 have an area ratio of from 1/0.02 to 1/0.07, and the maximum peak showing the component derived from bisphenol A and the peak derived from a molecular weight of from 320 to 350 have an area ratio of from 1/0.005 to 1/0.05.

13. The expanded molded article of a polycarbonate-based resin according to claim 10, wherein the peak derived from a molecular weight of from 210 to 230 is derived from a terminal portion constituting the polycarbonate-based resin.

14. The expanded molded article of a polycarbonate-based resin according to claim 10, wherein the maximum peak showing the component derived from bisphenol A and the peak derived from a molecular weight of from 210 to 230 have an area ratio of from 1/0.01 to 1/0.07.

15. The expanded molded article of a polycarbonate-based resin according to claim 10, wherein the maximum peak showing the component derived from bisphenol A and the peak derived from a molecular weight of from 290 to 320 have an area ratio of from 1/0.005 to 1/0.04.

16. The expanded molded article of a polycarbonate-based resin according to claim 10, wherein the expanded molded article has a density of 0.08 g/cm$^3$ or less.

17. The expanded molded article of a polycarbonate-based resin according to claim 10, wherein the expanded molded article has a cell density X of from $1.0\times10^8$ to $1.0\times10^{12}$ per cm$^3$ (wherein the cell density X is calculated by the following expression:

$$\text{cell density } X = (\rho/D-1)/\{(4/3)\cdot\pi\cdot(C/10/2)^3\}$$

wherein C represents an average cell diameter (mm); $\rho$ represents a density (kg/m$^3$) of the polycarbonate-based resin; and D represents a density (kg/m$^3$) of the expanded molded article).

18. The expanded molded article of a polycarbonate-based resin according to claim 10, wherein the molded expanded article contains a plasticizer having 2 or more ester bonds, a molecular weight of from 200 to 600, and a boiling point of from 250 to 500° C.

19. The expanded molded article of a polycarbonate-based resin according to claim 18, wherein the plasticizer is contained in an amount of from 5 to 50,000 ppm.

20. The expanded molded article of a polycarbonate-based resin according to claim 18, wherein the plasticizer is selected from an ester of an aliphatic polybasic carboxylic acid and an aliphatic monoalcohol, and an ester of an aliphatic polyhydric alcohol and an aliphatic monocarboxylic acid, and has from 2 to 4 ester bonds.

21. The expanded molded article of a polycarbonate-based resin according to claim 20, wherein the plasticizer is selected from diisobutyl adipate and glycerin diacetate monolaurate.

22. An expanded molded article of a polycarbonate-based resin which comprises a product obtained from the expanded particles according to claim 1.

23. Expanded particles of a polycarbonate-based resin comprising a polycarbonate-based resin as a base resin,
the expanded particles having a cell density X of from $1.0\times10^8$ to $1.0\times10^{12}$ per cm$^3$ (wherein the cell density X is calculated by the following expression:

$$\text{cell density } X = (\rho/D-1)/\{(4/3)\cdot\pi\cdot(C/10/2)^3\}$$

wherein C represents an average cell diameter (mm); $\rho$ represents a density (kg/m$^3$) of the polycarbonate-based resin; and D represents an apparent density (kg/m$^3$) of the expanded particles).

24. An expanded molded article of a polycarbonate-based resin comprising a polycarbonate-based resin as a base resin, the expanded molded article having a cell density X of from $1.0\times10^8$ to $1.0\times10^{12}$ per cm$^3$ (wherein the cell density X is calculated by the following expression:

$$\text{cell density } X=(\rho/D-1)/\{(4/3)\cdot\pi\cdot(C/10/2)^3\}$$

wherein C represents an average cell diameter (mm); $\rho$ represents a density (kg/m$^3$) of the polycarbonate-based resin; and D represents a density (kg/m$^3$) of the expanded molded article).

25. An expanded molded article of a polycarbonate-based resin comprising plural expanded particles containing a polycarbonate-based resin as a base resin, the expanded molded article containing a plasticizer having 2 or more ester bonds, a molecular weight of from 200 to 600, and a boiling point of from 250 to 500° C.

* * * * *